(12) United States Patent
Fujiwara et al.

(10) Patent No.: US 7,324,890 B2
(45) Date of Patent: Jan. 29, 2008

(54) IGNITION TIMING CONTROL APPARATUS FOR INTERNAL COMBUSTION ENGINE

(75) Inventors: Morio Fujiwara, Tokyo (JP); Hitoshi Inoue, Tokyo (JP); Akiyoshi Katayama, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/704,329

(22) Filed: Feb. 9, 2007

(65) Prior Publication Data

US 2007/0282517 A1   Dec. 6, 2007

(30) Foreign Application Priority Data

Jun. 6, 2006   (JP) ............................. 2006-157083

(51) Int. Cl.
*G06F 19/00* (2006.01)
*F02P 5/00* (2006.01)

(52) U.S. Cl. ............ 701/111; 123/406.13; 123/406.29; 73/35.03; 73/35.09

(58) Field of Classification Search ................ 701/111, 701/114; 123/406.16, 406.17, 406.19, 406.21, 123/406.29, 406.13; 73/35.03, 35.07, 35.09, 73/117.2, 118.1, 118.2
See application file for complete search history.

(56) References Cited

U.S. PATENT DOCUMENTS

| | | | | |
|---|---|---|---|---|
| 4,512,310 A | * | 4/1985 | Haraguchi et al. ..... | 123/406.21 |
| 5,065,724 A | * | 11/1991 | Takeda ................... | 123/406.29 |
| 6,474,302 B2 | * | 11/2002 | Takahashi et al. ..... | 123/406.21 |
| 6,805,097 B2 | * | 10/2004 | Sauler et al. .......... | 123/406.21 |
| 6,863,052 B2 | * | 3/2005 | Takahashi et al. ..... | 123/406.13 |

FOREIGN PATENT DOCUMENTS

| | | |
|---|---|---|
| JP | 58-053675 A | 3/1983 |
| JP | 58-165574 A | 9/1983 |
| JP | 59-025-081 A | 2/1984 |
| JP | 62-195465 A | 8/1987 |
| JP | 9-242655 A | 9/1997 |

\* cited by examiner

*Primary Examiner*—Willis R. Wolfe
*Assistant Examiner*—Johnny H. Hoang
(74) *Attorney, Agent, or Firm*—Sughrue Mion, PLLC

(57) ABSTRACT

An ignition timing control apparatus can obtain high output torque without generating output torque loss, and avoid the deterioration of audibility due to successive knock occurrences. A cylinder specific ignition timing setting section includes a reference ignition timing control section, and a cylinder specific correction value setting section having correction values of the same number as that of engine cylinders. The reference ignition timing control section calculates reference ignition timing common to all the cylinders and uniformly controls the ignition timings of all the cylinders to a retard angle side to prevent the occurrence of successive knocks. The cylinder specific correction value setting section calculates cylinder specific correction values to compensate for variation in the cylinder specific optimal ignition timings, and sets the cylinder specific correction values for cylinders other than those whose knock frequency becomes equal to a predetermined value or more so as to advance their ignition timings.

16 Claims, 21 Drawing Sheets

STORAGE VALUE UPON INTERRUPTION : Gsa

|  | CYLINDER #1 | CYLINDER #2 | CYLINDER #3 | CYLINDER #4 |
|---|---|---|---|---|
| IN CASE OF STORING DATA FOR ALL CYLINDERS AS ONE UNIT | #1_A | #2_A | #3_A | #4_A |

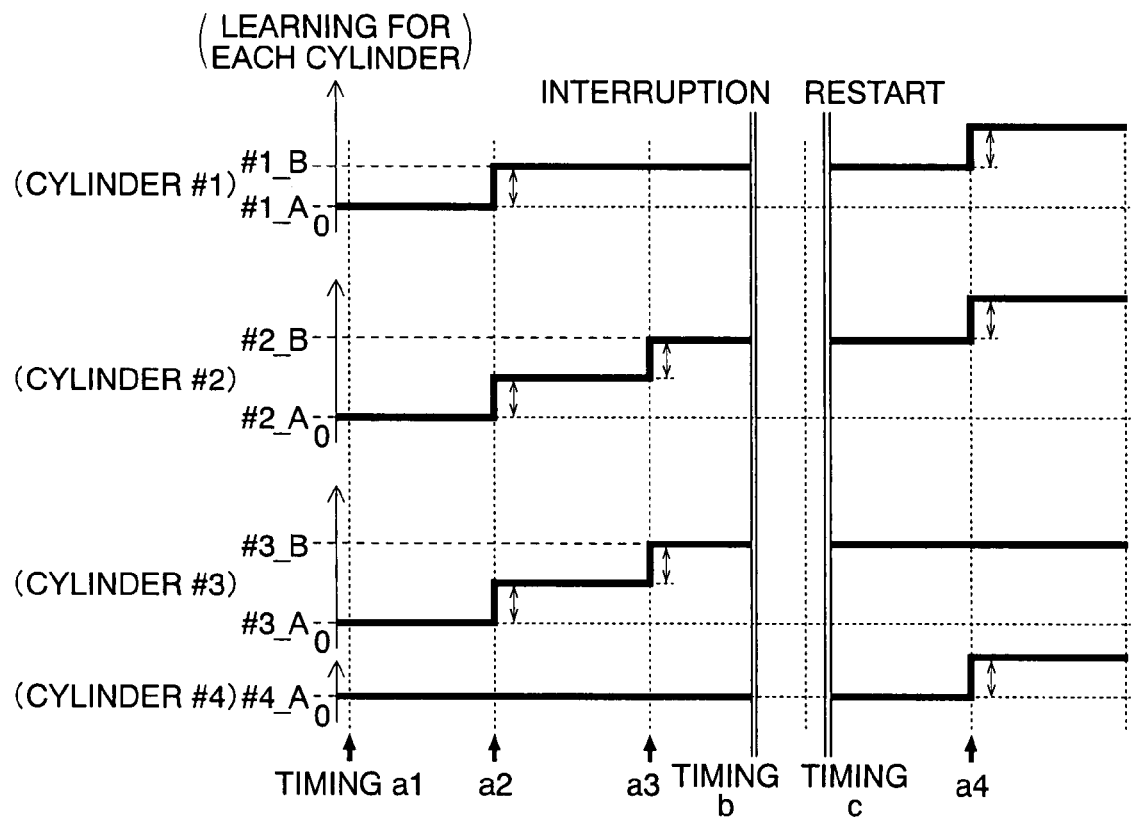

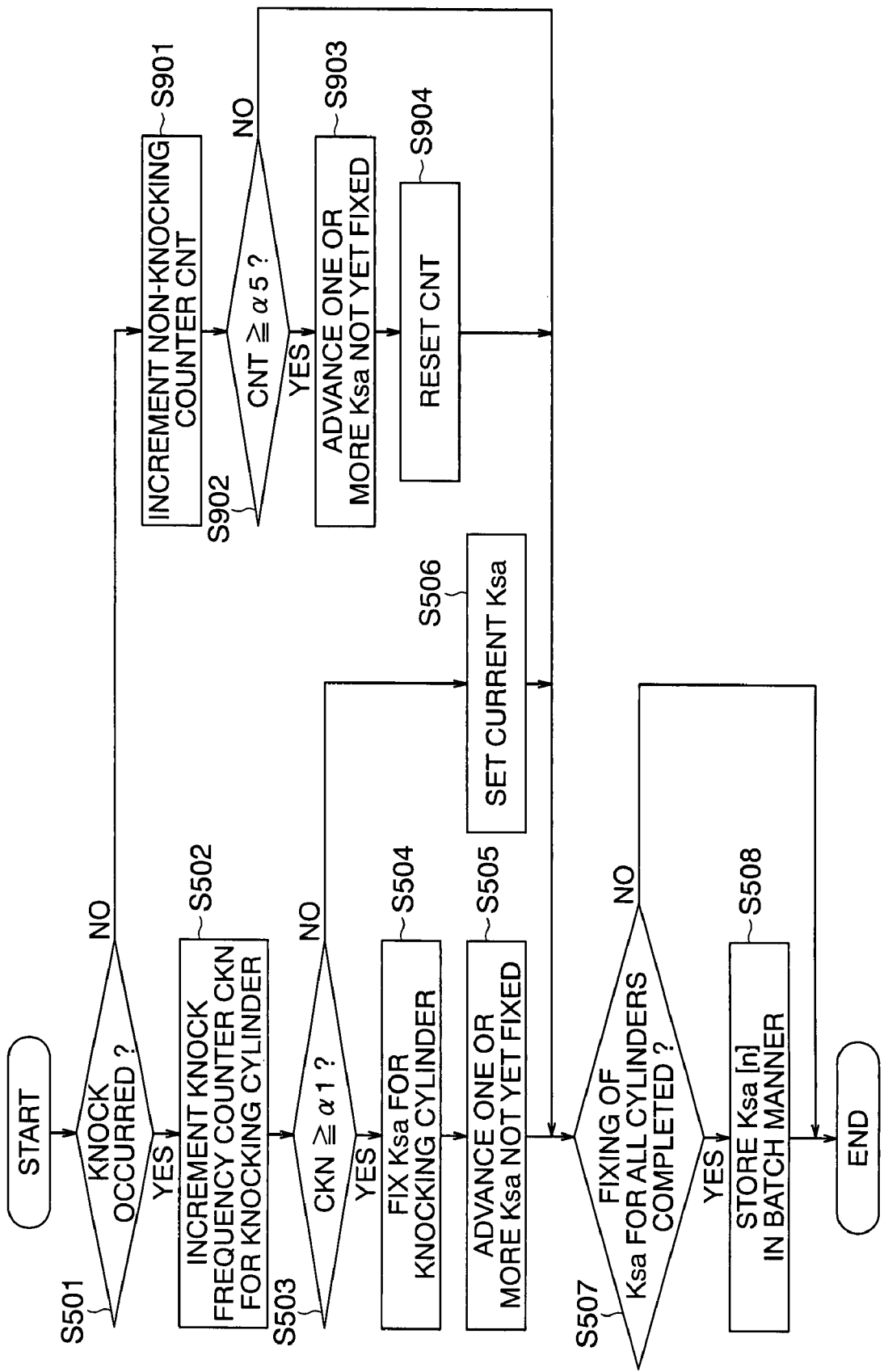

IGNITION TIMING CONTROL APPARATUS FOR INTERNAL COMBUSTION ENGINE

BACKGROUND OF THE INVENTION

1. Field of the Invention

The present invention relates to an ignition timing control apparatus for an internal combustion engine (hereinafter also referred to as an engine) having a plurality of cylinders, and more particularly, to novel technical improvements for suppressing the occurrence of knocking (hereinafter referred to also as a "knock") thereby to obtain high power.

2. Description of the Related Art

Conventionally, in an ignition timing control apparatus for an internal combustion engine, the ignition timing is retarded (controlled to a retard angle side) or advanced (controlled to an advance angle side) in accordance with the presence or absence of the occurrence of a knock (see, for example, a first patent document: Japanese patent application laid-open No. S58-53675). Also, there has been proposed that when a knock occurs in either of a plurality of cylinders, the ignition timing of all the cylinders is uniformly controlled to a retard angle side (see, for example, a second patent document: Japanese patent application laid-open No. S58-165574). In addition, there has been proposed that the occurrence of a knock is detected for each cylinder, and the ignition timing of a knocking cylinder (i.e., a cylinder in which a knock occurs) is independently retarded (see, for example, a third patent document: Japanese patent application laid-open No. S59-25081).

Further, there has been proposed an ignition timing control apparatus for an internal combustion engine which calculates the ignition timings of individual cylinders from a plurality of ignition timing maps set in advance for the individual cylinders, in order to avoid excessive retard angle control when all the cylinders are uniformly controlled to a retard angle side upon occurrence of a knock in a cylinder (see, for example, Japanese patent application laid-open No. H9-242655). Furthermore, there has also been proposed an ignition timing control apparatus for an internal combustion engine which, in order to avoid the excessively continuous occurrences of knocks when the ignition timings are controlled independently for individual cylinders, in case where knocking occurs in succession in the same cylinder, the ignition timing of the knocking cylinder alone is set to a retard angle side, whereas in case where knocking occurs in succession not in one and the same cylinder but in a plurality of cylinders, the ignition timings of all the cylinders are set to a retard angle side (see, for example, a fifth patent document: Japanese patent application laid-open No. S62-195465).

In the conventional ignition timing control apparatuses for an internal combustion engine, the ignition timings of all the cylinders are controlled to be uniformly retarded upon the occurrence of a knock, as in the above-mentioned second patent document, the ignition timings of all the cylinders are controlled to be uniformly retarded in accordance with the knock that occurred in a cylinder of which the knocking limit ignition timing is the latest among those of the plurality of cylinders in spite of the fact that the ignition timing at which a knock occurs (hereinafter referred to as a "knocking limit ignition timing") is different from one cylinder to another. As a result, there arises a problem that those cylinders whose knocking limit ignition timings are at a relatively advance angle side are operated in excessively retard ignition angle states, thus giving rise to output power loss.

In addition, in case where all the cylinders are uniformly controlled to a retard angle side, as stated above, the occurrence of knocking concentrates on a cylinder of which the knocking limit ignition timing is in a relatively retard angle side, among the plurality of cylinders, so there is the following problem. That is, the cylinder on which the occurrence of knocking concentrates and its related cylinder block is more greatly deteriorated in comparison with the other cylinders of which the knocking limit ignition timings are in a relatively advance angle side, thus leading to the possibility that the engine might be finally damaged.

Moreover, in case where the ignition timings for the individual cylinders are controlled independently of one another, as in the above-mentioned third patent document, the amount of retard angle corresponding to the occurrence of a knock is first reflected in actuality in the next ignition cycle of the knocking cylinder, so the amount of retard angle corresponding to the occurrence of a knock is not reflected on the other cylinders in spite of the fact that there is a possibility of the occurrence of knocking. As a result, there will arise a problem that knocking continuously occurs in an excessive period of time, thus giving rise to the possibility of deteriorating the audibility or auditory sensation of the user.

Further, in case where the ignition timing of each cylinder is calculated from a map for the purpose of avoiding output torque loss during uniform retard angle control, as in the above-mentioned fourth patent document, no consideration is given to the variation of the knocking limit ignition timing resulting from the individual variation of the engine or the variation of the knocking limit ignition timing due to aging. Thus, there is also the following problem. That is, the ignition timing can not always be set to optimum ignition timing in each of the cylinders, and hence it is after all impossible to avoid the loss of output torque to a satisfactory extent.

On the other hand, as disclosed in the above-mentioned fourth patent document, in case where, when continuous knocking occurs in the same cylinder, the ignition timing of the knocking cylinder alone is controlled to a retard angle side for the purpose of avoiding the occurrence of continuous knocking during independent retard ignition angle control, whereas when continuous knocking occurs in other than the one and same cylinder, the ignition timings of all the cylinders are uniformly controlled to a retard angle side, all the cylinders are controlled to be retarded in accordance with the result of the determination of the occurrence of continuous knocking based on the frequency of knock occurrences. Accordingly, two to several knocks will continuously or successively occur, so the audibility or auditory sensation of the user will be deteriorated even with the occurrence of a minimum of two excessively large continuous knocks, thus resulting in a problem of reduced marketability in comparison with the case where uniform retard ignition angle control is carried out.

SUMMARY OF THE INVENTION

In view of the above, the present invention is intended to solve both of the above-mentioned mutually conflicting problems that occur during uniform retard angle control and during independent retard angle control, respectively, and has for its object to obtain an ignition timing control apparatus for an internal combustion engine in which when the ignition timings of all the cylinders are uniformly controlled to a retard angle side upon detection of the occurrence of a knock, the variation in the optimum ignition timing of each cylinder is stored so as to make it possible to set optimum ignition timing for each cylinder, so that the occurrence of continuous knocking can be avoided to prevent the reduction in performance of the internal combustion engine.

Bearing the above object in mind, according to the present invention, there is provided an ignition timing control apparatus for an internal combustion engine which includes: a knock detection section that detects the occurrence of a knock in either of the plurality of cylinders; a reference ignition timing control section that sets reference ignition timing common to all of the plurality of cylinders; and a cylinder specific ignition timing setting section that sets cylinder specific ignition timings different from one another for the plurality of individual cylinders, respectively. The reference ignition timing control section includes a reference ignition timing correction section that corrects the reference ignition timing in accordance with a detection state of occurrence of knocking. The reference ignition timing correction section corrects the reference ignition timing to a retard angle side when the occurrence of a knock is detected, but corrects the reference ignition timing to an advance angle side when the occurrence of a knock is not detected. The cylinder specific ignition timing setting section includes a cylinder specific correction value setting section that sets cylinder specific correction values to compensate for variations in cylinder specific optimum ignition timings of the plurality of individual cylinders, respectively. The cylinder specific ignition timing setting section sets the cylinder specific ignition timings based on the reference ignition timing in accordance with the cylinder specific correction values. The cylinder specific correction value setting section sets the cylinder specific correction values of the same number as that of the plurality of cylinders. In a knock to knock occurrence period from the time of detection of a current knock occurring in any of the plurality of cylinders until the occurrence of the following knock is detected in either of the plurality of cylinders after a period of time in which the occurrence of a knock has not been detected in either of the plurality of cylinders, the cylinder specific correction value setting section sets, among the plurality of cylinder specific correction values, at least one cylinder specific correction value, which corresponds to a cylinder that has not yet reached a predetermined frequency of knock occurrences until the occurrence of the current knock, to an advance angle side value.

According to the present invention, by controlling each of the plurality of cylinders at an optimum ignition timing, it is possible to obtain high output torque without generating output torque loss. In addition, by uniformly controlling all the cylinders to a retard angle side in response to the occurrence of a knock in either of the cylinders, it is possible to avoid the occurrence of continuous knocking, so the output torque can be improved, and at the same time, the control of knocking can be ensured, thereby making it possible to suppress the deterioration of the user's audibility.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 24 is a timing chart illustrating the processing of storing a cylinder specific correction value according to the eleventh embodiment of the present invention.

FIG. 25 is a flow chart illustrating the processing of storing the cylinder specific correction value according to the eleventh embodiment of the present invention.

FIG. 26 is a flow chart illustrating the processing of calculating and storing a cylinder specific correction value according to a twelfth embodiment of the present invention.

DESCRIPTION OF THE PREFERRED EMBODIMENTS

Hereinafter, preferred embodiments of the present invention will be described while referring to the accompanying drawings.

Embodiment 1

Figure 1:
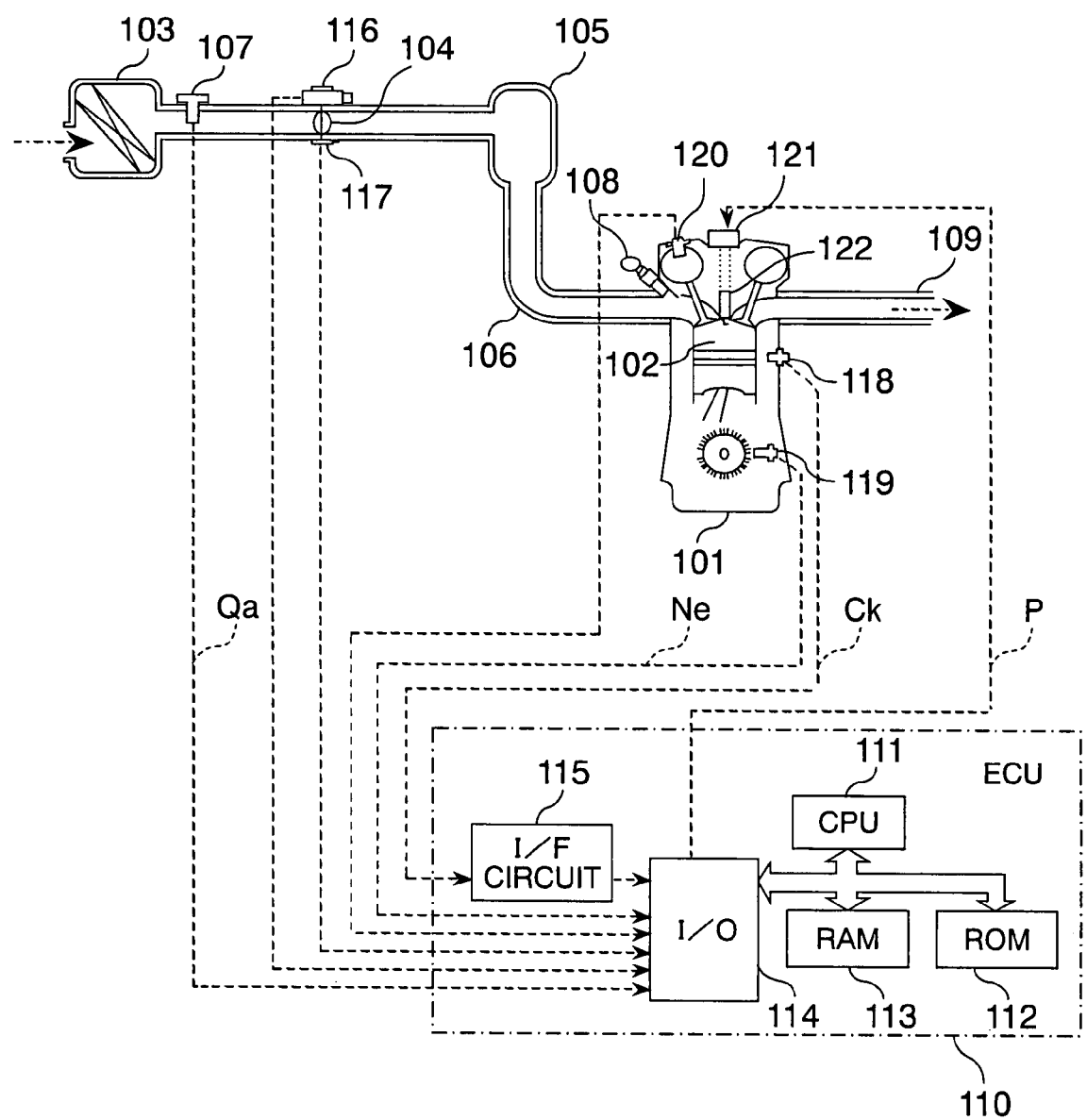
FIG. 1 is a block diagram schematically showing an ignition timing control apparatus for an internal combustion engine according to a first embodiment of the present invention.

Referring to the drawings and first to FIG. 1, there is schematically shown an ignition timing control apparatus for an internal combustion engine according to a first embodiment of the present invention. In FIG. 1, an internal combustion engine 101 is composed of a plurality of (e.g., N) cylinders 102. Here, only one of the cylinders 102 is typically illustrated.

Intake air is supplied to the individual cylinders 102 of the internal combustion engine 101 through an air cleaner 103, a throttle valve 104, a surge tank 105 and an intake manifold 106. An air flow sensor 107 for detecting an amount of intake air Qa is arranged at a location upstream of the throttle valve 104. The throttle valve 104 is driven to rotate in association with an accelerator pedal (not shown), which is operated by a driver, so that the amount of intake air Qa is thereby adjusted.

A throttle opening sensor 116 for detecting the opening degree of the throttle valve 104 (hereinafter referred to as a throttle opening) and an idle sensor 117 for detecting an idle state in which the throttle opening is nearly at a fully closed state are attached to the throttle valve 104. A knock sensor 118 for generating a knock signal Ck corresponding to a knock vibration is mounted on the main body block of the internal combustion engine (hereinafter also referred to simply as an engine) 101.

A crank angle sensor 119 for generating a crank angle signal corresponding to a crank angle position (a rotational angle or position of a crankshaft) and an engine rotational speed Ne is mounted on the crankshaft that is driven to rotate by the internal combustion engine 101. In addition, a cam angle sensor 120 for generating a cam angle signal is mounted on a camshaft that is driven to rotate in synchronization with the crankshaft. The detected pieces of information (the amount of intake air Qa, the knock signal Ck, the engine rotational speed Ne, etc.) of the various kinds of sensors 107, 116 through 120 are input to an ECU (engine control unit) 110.

A plurality of (e.g., N) fuel injection valves 108 corresponding to the individual cylinders 102, respectively, are arranged in the intake manifold 106. The fuel injection valves 108 serve to supply fuel to the respective cylinders 102 by injection thereof to form a mixture comprising the intake air and the fuel.

The amount of fuel injected from each fuel injection valve 108 is controlled by an injection drive signal (not shown) that is calculated by the ECU 110. The ECU 110 calculates an injection drive signal to be supplied to each fuel injection valve 108 in accordance with the amount of intake air Qa and the engine rotational speed Ne, and inputs it to a corresponding fuel injection valve 108.

A plurality of spark plugs 122 are mounted on the individual cylinders 102 of the internal combustion engine 101, respectively, for firing and burning the mixtures therein. The ignition timing of each spark plug 122 is controlled by an ignition signal P that is calculated by the ECU 110. The ECU 110 sets the ignition signal P in accordance with an ignition timing control calculation (to be described later), and applies the ignition signal P from an I/O controller 114 to a corresponding ignition coil 121 so that a discharge spark is generated by a corresponding spark plug 122.

The ECU 110 includes a CPU 111 that executes various calculation processing, a ROM 112 that stores operation programs for the CPU 111, etc., a RAM 113 that stores calculation results of the CPU 111, etc., the I/O controller 114 through which the detection signals from the various kinds of sensors are taken in and the control signals (the injection drive signal, the ignition signal P, etc.) for various kinds of actuators are output, and an I/F circuit 115 that processes and takes in the knock signal Ck from the knock sensor 118.

Though not illustrated here, the I/F circuit 115 is composed of a band-pass filter that passes a signal of knock oscillation frequencies, an amplifier circuit that amplifies the signal after passing through the band-pass filter, and a peak hold circuit that detects a peak value of the signal thus amplified.

The I/F circuit 115 amplifies a knock frequency signal (e.g., 7 [kHz]) that has passed through the band-pass filter, among the knock signals Ck input during a timing period (e.g., a crank angle period from ATDC 10 [degCA] to ATDC 40 [degCA] after compression top dead center TDC) including the time of occurrence of a knock, and holds the peak value of the knock frequency signal thus amplified (a maximum value of the knock frequency signal in the timing period including the time of occurrence of a knock). The peak value thus held in the I/F circuit 115 is converted from analog into digital form by the I/O controller 114 every combustion cycle of the individual cylinders, and is stored in the RAM 113 as a knock detection value Vp.

Figure 2:
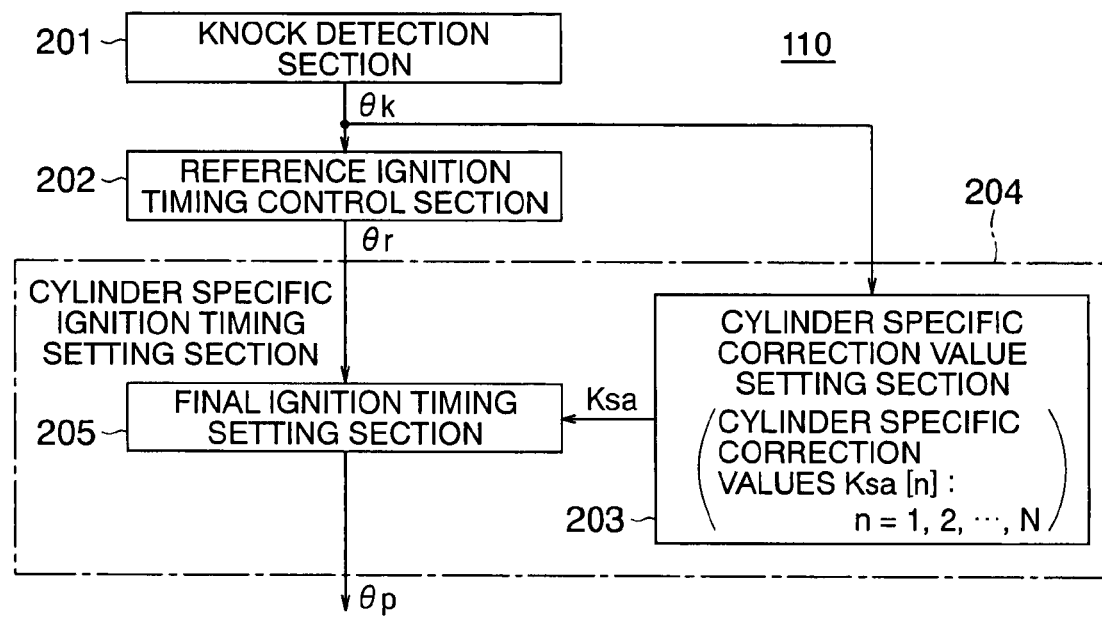
FIG. 2 is a functional block diagram showing the essential portions of the ignition timing control apparatus for an internal combustion engine according to the first embodiment of the present invention.

Next, the operation of the first embodiment of the present invention will be explained while referring to FIG. 2 together with FIG. 1. FIG. 2 is a functional block diagram that shows the essential portions of the ignition timing control apparatus for an internal combustion engine according to the first embodiment of the present invention, wherein there is illustrated the functional configuration of the ECU 110 mainly related to the knock sensor 118, the ignition coil 121 and the spark plug 122 in FIG. 1.

In FIG. 2, a knock detection section 201, a reference ignition timing setting section 202 and a cylinder specific ignition timing setting section 204 are shown as essential portions of the ignition timing control apparatus for an internal combustion engine. The cylinder specific ignition timing setting section 204 is provided with a cylinder specific correction value setting section 203 and a final ignition timing setting section 205. The knock detection section 201 is composed of the knock sensor 118 and the ECU 110 in FIG. 1, and it detects the occurrence of a knock in either of the plurality of cylinders, and inputs an amount of retard knock angle θk corresponding to the result of the knock detection or determination (the presence or absence of the occurrence of a knock) to the reference ignition timing setting section 202 and the cylinder specific correction value setting section 203 in the cylinder specific ignition timing setting section 204. In addition, the reference ignition timing control section 202 and the cylinder specific ignition timing setting section 204 are constituted by the I/O controller 114 and the CPU 111, the RAM 113 and the ROM 112 in the ECU 110.

The reference ignition timing setting section 202 sets a reference ignition timing θr common to all the plurality of cylinders, and inputs it to the final ignition timing setting section 205 in the cylinder specific ignition timing setting section 204. The reference ignition timing control section 202 includes a reference ignition timing correction section that corrects the reference ignition timing θr in accordance with the amount of knock retard angle θk (the state of detection of the occurrence of a knock). When the occurrence of a knock is detected, the reference ignition timing correction section in the reference ignition timing setting section 202 corrects the reference ignition timing θr to a retard angle side, whereas when the occurrence of a knock is not detected, it corrects the reference ignition timing θr to an advance angle side.

The cylinder specific correction value setting section 203 in the cylinder specific ignition timing setting section 204 sets cylinder specific correction values Ksa to compensate for the variations in the cylinder specific optimum ignition timing of the plurality of cylinders, respectively. The cylinder specific correction value setting section 203 sets cylinder specific correction values Ksa [n] (n=1, 2, . . . , N) of the same number (N) as that of the plurality of cylinders. Here, note that the symbol [ ] attached to the cylinder specific correction values Ksa means an arrangement, and the numeral "n (figure)" indicates a cylinder number.

In addition, as will be described later, in a "knock to knock occurrence period" (i.e., a period of occurrence between knocks) from the time of detection of a current knock occurring in any of the plurality of cylinders until the occurrence of the following knock is detected in either of the plurality of cylinders after a period of time in which the occurrence of a knock has not been detected in either of the plurality of cylinders, the cylinder specific correction value setting section 203 sets, among a plurality of cylinder specific correction values, at least one cylinder specific correction value Ksa corresponding to a cylinder, of which the number of occurrences or frequency of knocks does not reach a predetermined frequency of knocks α1 until the occurrence of a current knock, to an advance angle side value.

The final ignition timing setting section 205 in the cylinder specific ignition timing setting section 204 individually sets mutually different final ignition timings θp for the plurality of cylinders, respectively, in accordance with the cylinder specific correction values Ksa and based on the reference ignition timing θr.

In FIGS. 1 and 2, first of all, the knock detection section 201 stores a knock detection value Vp of a currently fired cylinder Np in the RAM 113 on the basis of a knock signal Ck output from the knock sensor 118. In addition, the CPU 111, which constitutes the knock detection section 201, determines whether a knock has occurred, based on the knock detection value Vp, according to a program (processing procedure) stored in the ROM 112 beforehand, and calculates an amount of knock retard angle θk corresponding to the result of the knock determination.

Subsequently, the CPU 111 that constitutes the reference ignition timing control section 202 calculates a basic ignition timing θb in accordance with a program (processing procedure) stored in the ROM 112 beforehand on the basis of the engine rotational speed Ne and the amount of intake air Qa that are stored in the RAM 113 through the I/O controller 114, and calculates a reference ignition timing θr by using the basic ignition timing θb and the amount of knock retard angle θk calculated by the knock detection section 201.

Then, the CPU 111, which constitutes the cylinder specific ignition timing setting section 204 the details of which will be described later, calculates final ignition timings θp for the individual cylinders, respectively, by using various input and output signals stored in the RAM 113 according to the processing operation by a program (processing procedure) stored in the ROM 112 beforehand. The individual final ignition timings θp are input to the ignition coils 121 as the ignition signals P, respectively, through the ignition timing I/O controller 114, whereby the spark plugs are ignited to control the ignition timings of the individual cylinders.

Hereinafter, reference will be made to the processing of calculating the final ignition timings θp by the cylinder specific ignition timing setting section 204. First of all, the cylinder specific correction value setting section 203 in the cylinder specific ignition timing setting section 204 operates as the functions of the I/O controller 114, the RAM 113, the ROM 112 and the CPU 111, similar to the cylinder specific ignition timing setting section 204.

The cylinder specific correction value setting section 203 has correction values Ksa [n] of the same number as that of the cylinders which constitute the internal combustion engine 101, and as stated above. In a knock to knock occurrence period (i.e., a period of time from a time point at which the reference ignition timing θr has been controlled to a retard angle side with respect to a current knock occurring in either of the cylinders until a time point at which the reference ignition timing θr is again controlled to a retard angle side upon occurrence of the following knock in either of the cylinders after a period of time in which the occurrence of a knock has not been detected in either of the cylinders and the reference ignition timing θr has been controlled to an advance angle side, the cylinder specific correction value setting section 203 sets at least one cylinder specific correction value Ksa, among those Ksa [n] of cylinders for which the predetermined number or frequency of knock occurrences α1 is not yet reached until the occurrence of the current knock, in such a manner that the ignition timing of the at least one cylinder is controlled to a more advance angle side in comparison with the ignition timings of the cylinders for which the predetermined number or frequency of knock occurrences α1 has already been reached.

At this time, the cylinder specific correction value Ksa for a cylinder which has reached the predetermined knock frequency α1 with the occurrence of a current knock is fixed to the value as it is. Or, instead of the above-mentioned processing of fixing the cylinder specific correction value Ksa, the cylinder specific correction value Ksa of the cylinder which has reached the predetermined knock frequency α1 with the occurrence of the current knock may be fixed to a value with which the ignition timing thereof is made to a relatively retard angle side in comparison with the current value as it is.

Subsequently, the final ignition timing setting section 205 in the cylinder specific ignition timing setting section 204 calculates the final ignition timing θp of a cylinder to be ignited next time based on the cylinder specific correction values Ksa [n] set by the cylinder specific correction value setting section 203 and the reference ignition timing θr calculated by the reference ignition timing control section 202, and generates an ignition signal P to fire a mixture of air and fuel at the timing at which the crank angle of the cylinder to be ignited next time reaches the final ignition timing θp.

Figure 3:
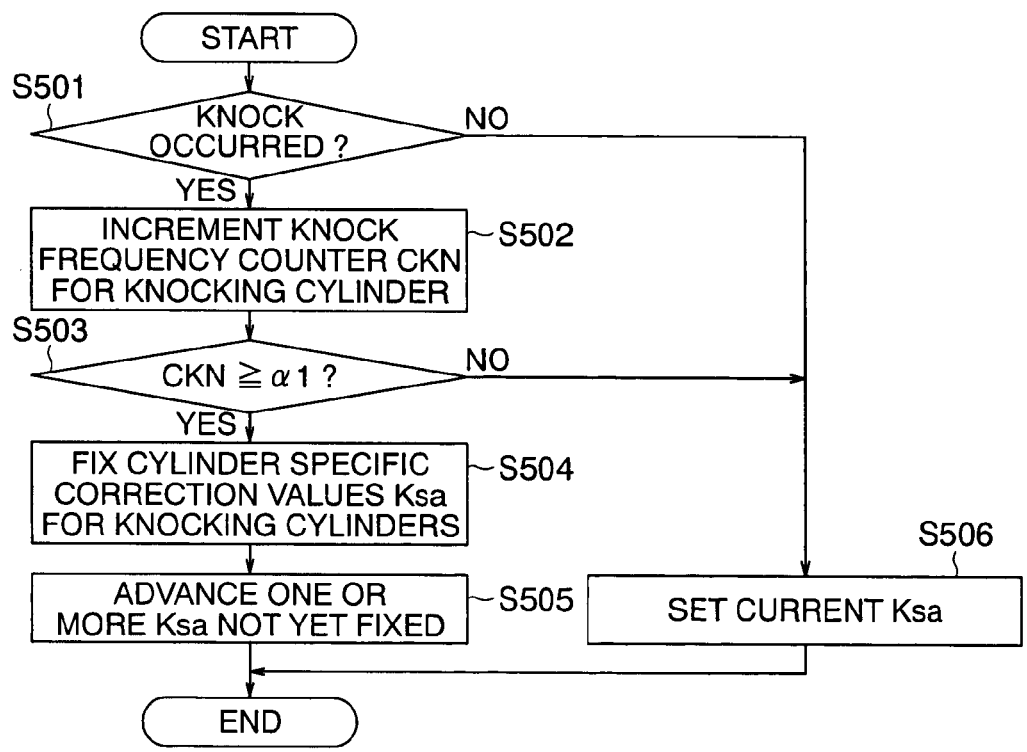
FIG. 3 is a flow chart illustrating the processing of calculating a cylinder specific correction value according to the first embodiment of the present invention.

Next, more detailed reference will be made to the processing operation of the cylinder specific correction value setting section 203 while referring to FIG. 3. FIG. 3 is a flow chart that shows the calculation processing of the cylinder specific correction values Ksa [n] executed by the CPU 111. The processing routine of FIG. 3 is called by an interrupt signal generated at each prescribed, specific crank angle (e.g., BTDC 75 [deg CA] (a crank angle of 75 degrees before TDC)), and is executed by a program (processing procedure) stored in the ROM 112 beforehand by using various input signals and various output signals stored in the RAM 113. Here, note that the term "BTDC" represents a crank angle before the compression top dead center of the internal combustion engine 101.

In FIG. 1, the crank angle sensor 119 generates a crank angle signal (corresponding to a crank angle position and an engine rotational speed Ne) comprising pulses that synchronize with the rotation of the crankshaft. Similarly, the cam angle sensor 120 generates a cam angle signal (cylinder identification signal) comprising pulses that synchronize with the rotation of the camshaft which performs one revolution during two revolutions of the crankshaft. The crank angle signal and the cam angle signal are input to the ECU 110, and stored in the RAM 113 through the I/O controller 114.

In FIG. 3, first of all, the ECU 110 identifies, through calculations based on the crank angle signal and the cam angle signal, the identification number n of a cylinder for which current ignition control is to be carried out, and determines whether a knock has occurred in the n-th cylinder (step S501). Specifically, at this time, a knock detection value Vp that was converted from analog into digital form by the I/O controller 114 and stored in the RAM 113 is compared with a knock determination level Vth calculated beforehand, and a determination as to whether a knock has occurred is made based on whether the relation of "Vp>Vth" is satisfied.

When it is determined as Vp≦Vth in step S501 (that is, NO), it is assumed that no knock has occurred in the currently ignited cylinder Np, and the control flow advances to step S506 (to be described later). On the other hand, when it is determined as Vp>Vth in step S501 (that is, YES), it is assumed that a knock has occurred in the currently ignited cylinder Np, and the value of a knock frequency counter CKN for the knocking cylinder is counted up (incremented) by a predetermined value (e.g., one) (step S502). Thus, in step S502, the knock frequency counter CKN is updated to "CKN+the predetermined value".

Subsequently, it is determined whether the knock frequency counter CKN of the knocking cylinder Nk is equal to or more than a predetermined number of times (i.e., a predetermined value) α1 (e.g., 2 [times]) (step S503), and when it is determined as CKN<α1 (that is, NO), the control flow proceeds to step S506. On the other hand, when it is determined as CKN≧α1 in step S503 (that is, YES), the cylinder specific correction value Ksa [Nk] set for the knocking cylinder Nk is fixed to the last value (step S504).

Although in step S504 in FIG. 3, the cylinder specific correction value Ksa [Nk] for a cylinder which has reached the predetermined knock frequency α1 with the occurrence of a current knock is fixed to the value as it is, the value Ksa [Nk] may be decreased by a predetermined value, or decreased to a value "Ksa [Nk]−the predetermined value", and may be fixed to such a value with which the ignition timing thereof is relatively retarded in comparison with the original or non-changed value as it is.

Then, the cylinder specific correction value Ksa [Nm] (Nm indicates cylinders other than the knocking cylinder Nk) of each of the cylinders for which the knock frequency counter CKN is less than the predetermined number of times α1 is increased by a predetermined value, so that the ignition timings for the non-knocking cylinders are set to an advance angle side from the cylinder specific correction value Ksa [Nk] of the knocking cylinder Nk of which the frequency of knock occurrences has reached the predetermined number of times α1 (step S505), and the processing routine of FIG. 3 is terminated.

The reason for performing the advance angle processing of the cylinder specific correction value Ksa in step S505 only when the frequency of knock occurrences reaches the predetermined number of times α1 or more is to enhance the setting accuracy of the cylinder specific correction value Ksa by setting the cylinder specific correction value Ksa only on the condition that it is assumed that a knock has occurred without fail.

On the other hand, when the occurrence of a knock is not detected in step S501, or when the knock frequency counter CKN of the knocking cylinder does not reach the predetermined number of times α1 in step S503, the current cylinder specific correction value Ksa is not changed but set as it is (step S506), and the processing routine of FIG. 3 is then terminated.

Although in step S506 in FIG. 3, the current cylinder specific correction value Ksa [Nk] is held when the knock frequency counter CKN of the knocking cylinder Nk does not reach the predetermined number of times α1, the value of the cylinder specific correction value Ksa may be increased to set the ignition timing to an advance angle side, whereby a condition in which a knock occurs in a reliable manner can be produced to increase the setting accuracy of the cylinder specific correction value Ksa. In addition, on the contrary, the ignition timing may be set to a retard angle side by decreasing the cylinder specific correction value Ksa in step S506.

As described above, the cylinder specific correction value setting section 203 calculates the cylinder specific correction value Ksa according to the processing routine of FIG. 3.

Figure 4:
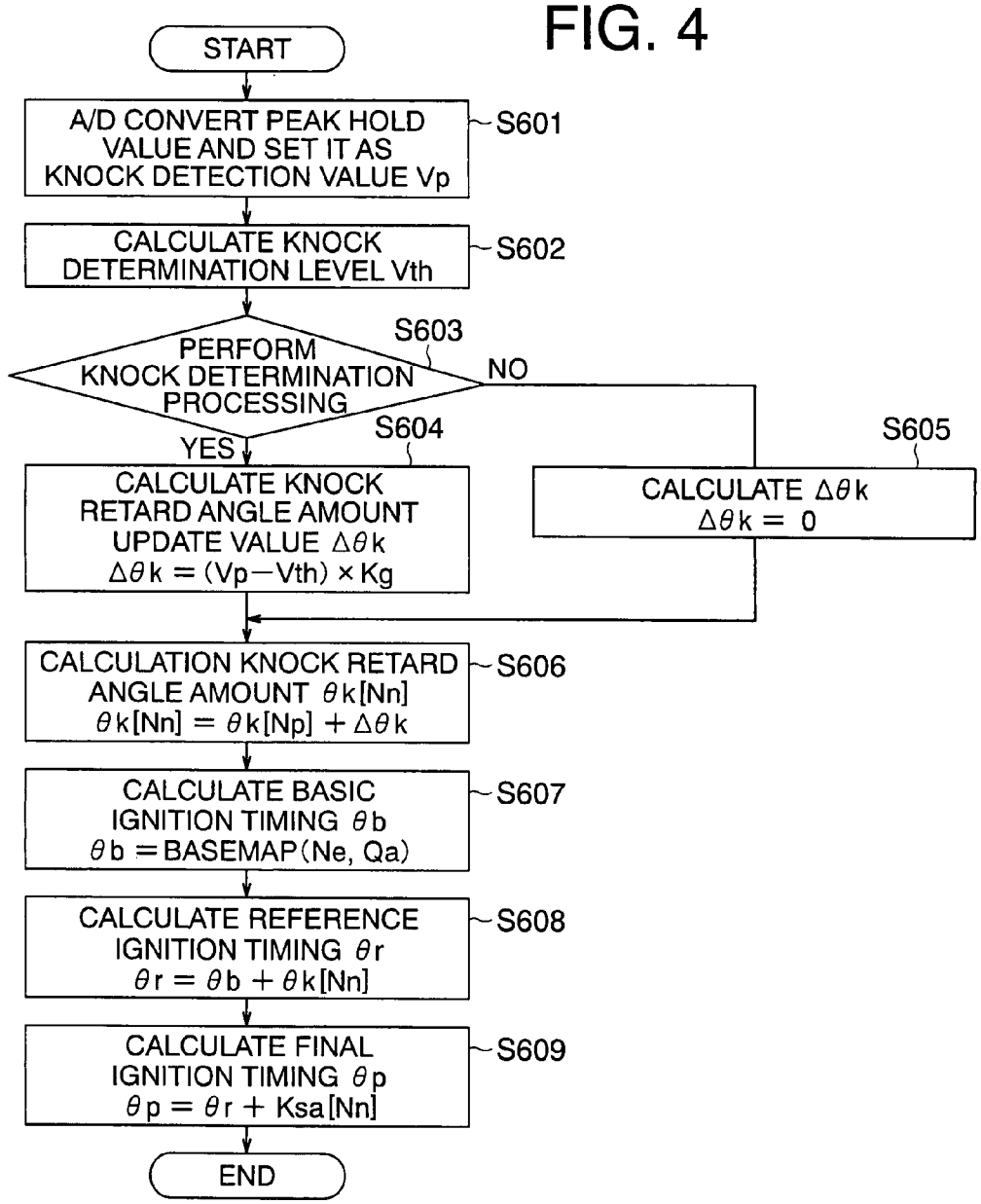
FIG. 4 is a flow chart illustrating the processing of calculating final ignition timing according to the first embodiment of the present invention.

Next, a further detailed explanation will be given to the processing operation of the final ignition timing setting section 205 in the cylinder specific ignition timing setting section 204 while referring to FIG. 4. FIG. 4 is a flow chart that shows the calculation of the final ignition timing executed by the CPU 111.

Similar to the processing routine of FIG. 3, the processing routine of FIG. 4 is called by an interrupt signal generated at each prescribed, specific crank angle (e.g., BTDC 75 [deg CA]), and is executed by a program (processing procedure) stored in the ROM 112 beforehand by using various input signals and various output signals stored in the RAM 113.

In FIG. 4, steps S601 through S603 correspond to the determination step S501 in FIG. 3.

First of all, the CPU 111, which constitutes the final ignition timing setting section 205, peak holds a knock signal level based on a knock signal Ck, converts the peak hold value from analog into digital form through the I/O controller 114, and stores the thus A/D converted value in the RAM 113 as a knock detection value Vp (step S601).

In addition, a knock determination level Vth, which becomes a determination reference for the knock detection value Vp, is calculated (step S602), and the knock detection value Vp and the knock determination level Vth are compared with each other to make a determination as to whether a knock has occurred (step S603). When it is determined as Vp>Vth in step S603 (that is, YES), it is assumed that a knock has occurred in the currently ignited cylinder Np, and an amount of knock retard angle update value Δθk is calculated by using an amount of knock retard angle reflection Kg set beforehand, as shown in the following expression (1) (step S604).

$$\Delta\theta k=(Vp-Vth)\times Kg \quad (1)$$

As is clear from expression (1) above, the amount of knock retard angle update value Δθk is proportional to the magnitude of a difference between the occurred knock detection value Vp and the knock determination level Vth.

On the other hand, when it is determined as Vp≦Vth in step S603 (that is, NO), it is assumed that no knock has occurred in the currently ignited cylinder Np, and an amount of knock retard angle update value Δθk is calculated, as shown in the following expression (2) (step S605).

$$\Delta\theta k=0 \quad (2)$$

When the amount of knock retard angle update value Δθk is calculated according to expression (1) or expression (2) above, the amount of knock retard angle θk [Nn] of a cylinder Nn to be ignited next time is subsequently updated by adding the amount of knock retard angle update value Δθk to the amount of knock retard angle θk Np of the currently ignited cylinder Np, as shown in the following expression (3) (step S606).

$$\theta k[Nn]=\theta k[Np]+\Delta\theta k \quad (3)$$

In addition, the basic ignition timing θb is calculated from a reference ignition timing map BASEMAP (Ne, Qa) that is set beforehand and stored in the ROM 112, based on the engine rotational speed Ne and the amount of intake air Qa (step S607).

Then, the reference ignition timing θr of the cylinder Nn to be ignited next time is calculated, as shown in the following expression (4), by using the basic ignition timing θb and the amount of knock retard angle θk [Nn] of the cylinder Nn to be ignited next time that has been calculated in step S606 (step S608).

$$\theta r=\theta b+\theta k[Nn] \quad (4)$$

Finally, a final ignition timing θp is calculated in accordance with the reference ignition timing θr and the cylinder specific correction values Ksa [Nn] of the respective cylinders, as shown in the following expression (5) (step S609), and the processing routine of FIG. 4 is terminated.

$$\theta p=\theta r+Ksa[Nn] \quad (5)$$

Although in step S609 in FIG. 4, the final ignition timing θp for each cylinder is calculated by adding the cylinder specific correction value Ksa [Nn] to the reference ignition timing θr that is common to all the cylinders, it may be calculated by multiplication of both of them, as shown in the following expression (6).

$$\theta p=\theta r\times Ksa[Nn] \quad (6)$$

Figure 5:
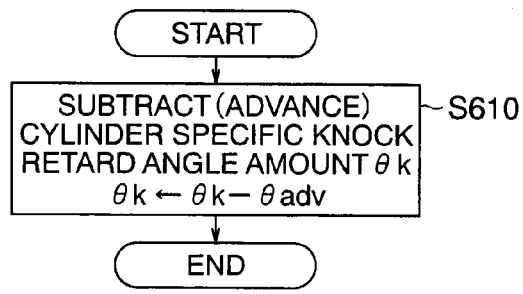
FIG. 5 is a flow chart illustrating the processing of calculating a knock retard angle according to the first embodiment of the present invention.

In addition, the amounts of cylinder specific knock retard angles θk [n] (n=1, 2, ..., N) are called and executed by an interrupt signal that is generated at a fixed time interval, as shown in step S610 in a flow chart in FIG. 5. That is, in step S610, the amounts of cylinder specific knock retard angles θk [n] are decreased (i.e., updated to an advance angle side) by successively subtracting therefrom a predetermined amount θa that is set beforehand, as shown in the following expression (7).

$$\theta k[n]=\theta k[n]-\theta a \quad (7)$$

As a result, the ignition timings for the cylinders based on the amounts of cylinder specific knock retard angles θk [n] are successively controlled to an advance angle side at the fixed time interval. Although in step S610 in FIG. 5, the calculation processing of the amounts of cylinder specific knock retard angles θk [n] is executed according to an interrupt signal that occurs at a fixed time interval, it may be executed by an interrupt signal generated at each prescribed, specific crank angle (e.g., BTDC 75 [deg CA]).

Next, a further specific explanation will be given to the calculation processing of the cylinder specific correction values Ksa [n] while referring to a timing chart in FIG. 6. In FIG. 6, there is shown a specific example of the change over time (transition) of the ignition timing and the cylinder specific correction values Ksa in which the individual cylinders #1 through #4 of the internal combustion engine 101 in the form of a four-cylinder engine are controlled in ignition in the order of cylinder numbers or identifications #1→#3→#4→#2.

Figure 6A:
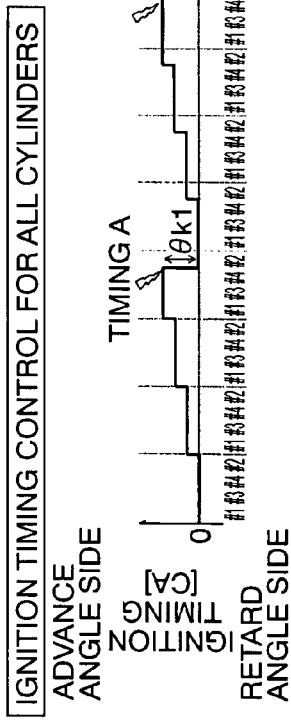
FIG. 6 is a timing chart showing the cylinder specific ignition timing setting processing according to the first embodiment of the present invention in comparison with conventional processing (control processing according to ignition timing common to all the cylinders).
Figure 6B:
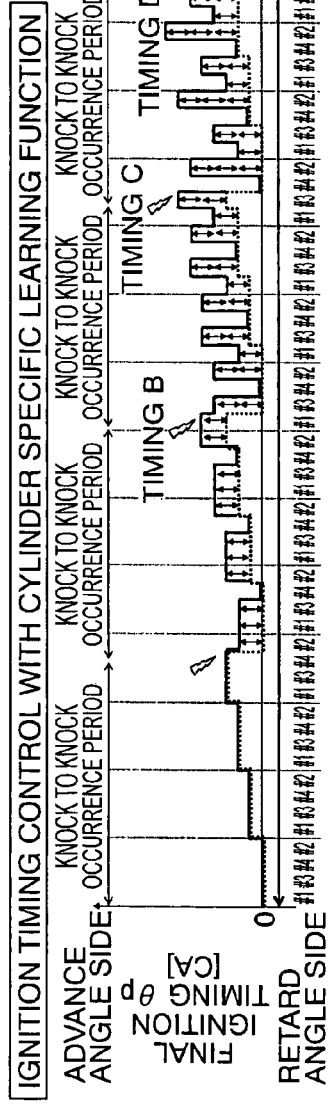
Figure 6C:
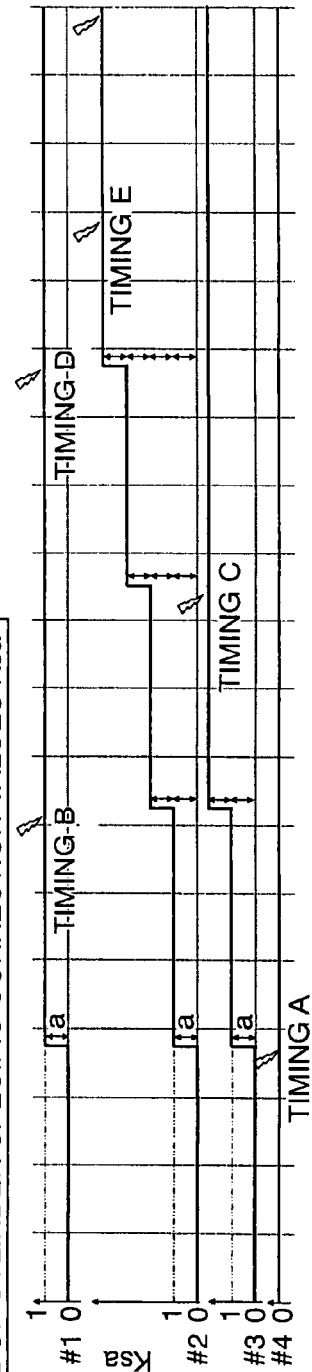

FIG. 6(A) shows an conventional ignition timing control operation common to all the cylinders, wherein the ignition timings of all the cylinders are uniformly controlled to a retard angle side without distinguishing a knocking cylinder(s) from the other non-knocking cylinders upon occurrence of a knock. FIG. 6(B) shows an ignition timing control operation with a cylinder specific learning function of the cylinder specific ignition timing setting section 204 according to the first embodiment of the present invention. FIG. 6(C) shows the changes over time of the cylinder specific correction values Ksa, which are calculated by the cylinder specific correction value setting section 203 in the cylinder specific ignition timing setting section 204, for the individual cylinders #1 through #4, respectively. In addition, the respective timings A through E (knock occurrence timings) in FIGS. 6(A) through (C) correspond to the boundaries of knock to knock occurrence periods (e.g., a period of time from timing A to timing B).

In FIG. 6(A) which shows a conventional operation, first of all, the ignition timings in a non-knocking period (i.e., a period of time from a start point at a left end in this figure to timing A) is successively uniformly controlled to an advance angle side by a rate of a constant amount at each fixed time interval Ta for all the cylinders.

Then, when a knock has occurred in the cylinder #4 at timing A, the ignition timing of a cylinder #2 to be ignited next time is set to a value which is obtained by subtracting, from the ignition timing set for the cylinder #4, a knock retard angle θk1 that is calculated in accordance with the strength of a knock that occurred in the cylinder #4, and the ignition of the cylinder #2 is controlled at the timing thus set.

Thereafter, if the condition of no knocking continues, the ignition timing is successively moved by a predetermined amount in an advance angle direction at each elapse of the fixed time Ta, as stated above, whereas when a knock has occurred, the ignition timing of a cylinder to be ignited following the knocking cylinder is calculated by reflecting thereon an amount of knock retard angle θk corresponding to the strength of the knock, similar to the calculation of the ignition timing at timing A. The above-mentioned ignition timing control processing is executed at each prescribed, specific crank angle, similarly as stated above.

Now, reference will be made to the ignition timing control operation of the cylinder specific ignition timing setting section 204 according to the first embodiment of the present invention while referring to FIG. 6(B). First, the ignition timing is successively advanced by a predetermined amount at each predetermined time interval Ta, similar to FIG. 6(A), but the processing after occurrence of a knock at timing A is different from that of FIG. 6(A). Here, note that the final ignition timing θp calculated by the cylinder specific ignition timing setting section 204 may be obtained by adding the cylinder specific correction value Ksa to the reference ignition timing θr common to all the cylinders, or it may be obtained by multiplying the cylinder specific correction value Ksa to the reference ignition timing θr, as stated above.

In FIG. 6(B), it is assumed that a knock in the cylinder #4 occurred at timing A, as stated above. In this case, first, when the frequency of knock occurrences of the knocking cylinder #4 reaches the predetermined number of times α1 or more, the cylinder specific correction value Ksa of the cylinder #4 is fixed as it is, as shown in FIG. 6(C), whereas for the cylinders #1 through #3 in which the frequency of knock occurrences is less than the predetermined number of times α1, the cylinder specific correction values Ksa are set to a more advance angle side from the cylinder specific correction value Ksa of the cylinder #4. That is, the cylinder specific correction value Ksa (#4) of the cylinder #4 is held as it is, but the cylinder specific correction values Ksa (#1) through Ksa (#3) of the remaining cylinders #1 through #3 (i.e., cylinders other than cylinder #4) are added by a predetermined value a so that they are updated so as to advance their ignition timings. Hereinafter, description will be made by assuming that the predetermined value a is equal to 1.

Subsequently, the final ignition timing θp (#2) of cylinder #2, which is a cylinder to be ignited following the cylinder #4, is calculated by using the reference ignition timing θr and the cylinder specific correction value Ksa (#2) of the cylinder #2, as shown by the following expression (8).

$$\theta p(\#2) = \theta r + Ksa(\#2) \quad (8)$$

Hereinafter, the reference ignition timing θr and the cylinder specific correction values Ksa [n] (n=1, 2, ... N) are added in the same way as stated above, so that the individual final ignition timings θp are calculated. Accordingly, the final ignition timings θp of the cylinders #1 through #3 obtained by using the cylinder specific correction values Ksa to which the predetermined value a (=1) is added in FIG. 6(C) are set to an advance angle side advanced by the predetermined value a from the ignition timing of the cylinder #4 for which the cylinder specific correction value Ksa is fixed, as shown in FIG. 6(B).

Subsequently, in case where, as shown in FIG. 6(B), a knock occurs in the cylinder #1 at timing B, a knock occurs in the cylinder #3 at timing C, a knock occurs in the cylinder #2 at timing D, and a knock occurs in the cylinder #4 at timing E, the cylinder specific correction values Ksa are fixed or set at an advance angle side at the individual timings B through E, as in the calculation processing at timing A, and the final ignition timing θp is calculated by using the cylinder specific correction values Ksa thus updated and set. The cylinder specific correction values Ksa progressively absorb the ignition variations of the individual cylinders as the updating and setting processing proceeds, and the final ignition timings θp, which are set for the cylinders #1 through #4, respectively, are becoming different from one another with the elapse of time, as shown in FIG. 6(B).

As described above, according to the first embodiment of the present invention, there are provided the cylinder specific correction values Ksa corresponding in number to the cylinders that constitute the internal combustion engine 101, and the knocking limit ignition timing of each the cylinder can set the final ignition timing θp can be set so as to be made as cylinder specific knock limit ignition timings, respectively, by the addition of the reference ignition timing θr, which are common to all the cylinders, and the cylinder specific correction values Ksa. As a result, it is possible to obtain high output torque without generating output torque loss.

In addition, in response to the occurrence of a knock in either cylinder of the internal combustion engine 101 having a plurality of cylinders, the reference ignition timings θr are retarded so that all the cylinders are uniformly controlled in their ignition timings to a retard angle side, thereby making it possible to avoid continuous or successive generation of knocking. Accordingly, it is possible to ensure excellent knock controllability while suppressing the deterioration of user's audibility, so it is possible to make the improvement of the output torque and the suppression of the deterioration of audibility compatible with each other.

Further, the cylinder specific correction values Ksa of the cylinders other than those cylinders for which the frequency of knock occurrences becomes equal to or more than the predetermined number of times α1 are set to an advance angle side, whereby the cylinder specific correction values Ksa can be set only under the condition that it is assumed that a knock has occurred without fail, thus making it possible to improve the setting accuracy of the cylinder specific correction values Ksa.

Embodiment 2

Figure 7:
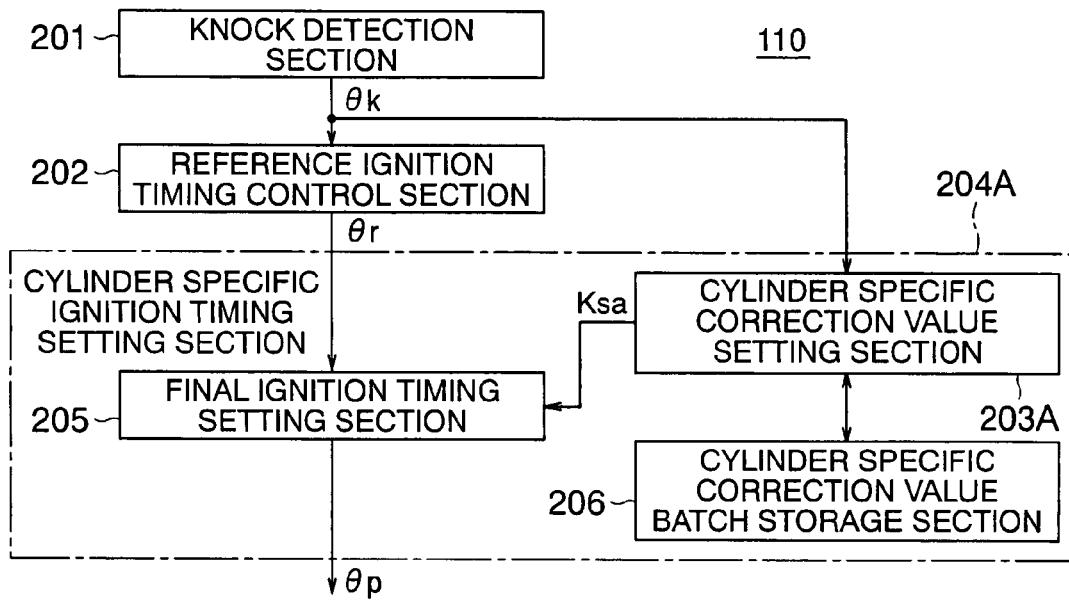
FIG. 7 is a functional block diagram showing the essential portions of an ignition timing control apparatus for an internal combustion engine according to a second embodiment of the present invention.

Although in the above-mentioned first embodiment (see FIG. 2), no mention is made to a storage section in association with the cylinder specific correction value setting section 203, a cylinder specific correction value batch storage section 206 in association with a cylinder specific correction value setting section 203A may be provided in a cylinder specific ignition timing setting section 204A, as shown in FIG. 7.

Hereinafter, reference will be made to a second embodiment of the present invention while referring to a flow chart in FIGS. 7 and 8 together with FIG. 1.

FIG. 7 is a functional block diagram that illustrate essential portions of an ignition timing control apparatus for an internal combustion engine according to the second embodiment of the present invention, wherein the parts or components same as those described above (see FIG. 2) are identified by the same symbols or by the same symbols with "A" affixed to their ends, while omitting a detailed explanation thereof. The overall construction of the ignition timing control apparatus for an internal combustion engine according to the second embodiment of the present invention is as shown in FIG. 1.

In addition, the basic calculation processing for ignition timing control is as shown above (see FIG. 4 and FIG. 5), so a detailed explanation thereof is omitted here.

In FIG. 7, the cylinder specific correction value setting section 203A includes a cylinder specific correction value batch storage section 206 that stores all the cylinder specific correction values Ksa corresponding to the plurality of cylinders in a batch or collective manner. Also, the cylinder specific correction value setting section 203A fixes, among the plurality of cylinder specific correction values Ksa [n], a cylinder specific correction value Ksa corresponding to a cylinder, which has reached the predetermined frequency of knock occurrences α1 until the occurrence of a current knock in a knock to knock occurrence period, to the last value thereof.

In addition, the cylinder specific correction value setting section 203A repeatedly performs the processing of setting, to an advance angle side, at least one cylinder specific correction value Ksa corresponding to a cylinder which has not reached the predetermined frequency of knock occurrences α1 until the occurrence of the current knock. Also, when all the cylinder specific correction values Ksa [n] corresponding to the plurality of cylinders are respectively fixed at least one time, the cylinder specific correction value setting section 203A stores all the cylinder specific correction values Ksa [n] in the cylinder specific correction value batch storage section 206 in a collective manner. That is, the cylinder specific correction value batch storage section 206 stores the cylinder specific correction values Ksa [n] (n=1, 2, . . . , N), which exist just only the number of the cylinders N that constitute the internal combustion engine 101, only by the number of cylinders N in a collective manner.

Hereinafter, further detailed explanation reference will be given to the processing operation of the second embodiment of the present invention while referring to FIG. 8.

FIG. 4 is a flow chart that shows a processing operation of the cylinder specific correction value setting section 203A according to the second embodiment of the present invention, in which steps S501 through S506 are the same processes as those in the above-mentioned embodiment (see FIG. 3). The processing routine of FIG. 8 is executed in response to an interrupt signal generated at each prescribed, specific crank angle.

Figure 8:
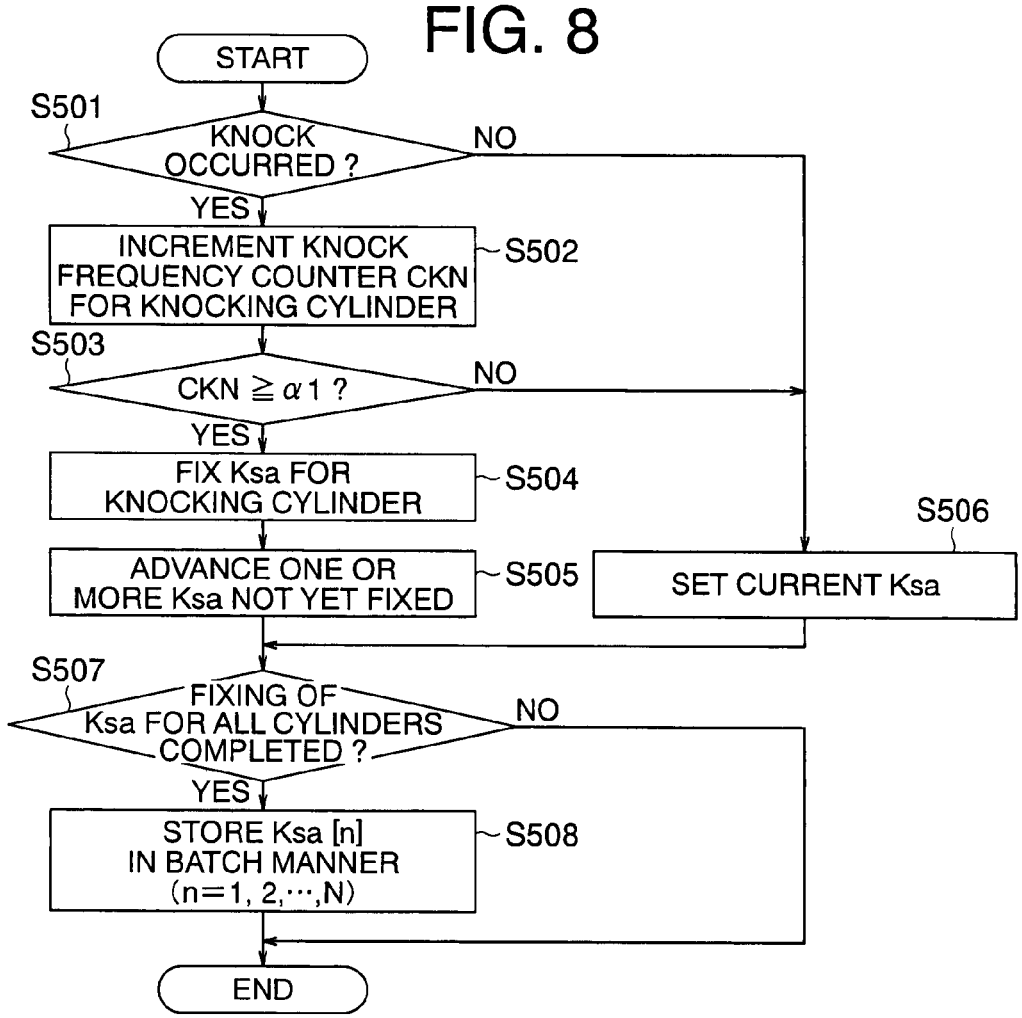
FIG. 8 is a flow chart illustrating the processing of calculating and storing a cylinder specific correction value according to the second embodiment of the present invention.

In FIG. 8, following the update calculation processing (steps S501 through S506) of the cylinder specific correction values Ksa, it is determined whether the fixing of the cylinder specific correction values Ksa for all the cylinders is completed (step S507). In step S507, when the knock frequency counter CKN set for each cylinder becomes the predetermined frequency α1 (e.g., two [times]) for all the cylinders, it is determined that the fixing of the cylinder specific correction values Ksa of all the cylinders has been completed (that is, YES), so that the cylinder specific correction values Ksa [n] of all the cylinders (n=1, 2, 3, and 4 in case of four cylinders) are collectively stored in the correction value batch storage section 206 as one set or unit (step S508), and the processing routine of FIG. 8 is terminated.

On the other hand, in step S507, when a value for at least one cylinder among those of the knock frequency counters CKN set for the cylinders, respectively, indicates less than the predetermined number of times α1, it is determined that the fixing of a cylinder specific correction value Ksa in the at least one cylinder is not completed (that is, NO), and the processing routine of FIG. 8 is terminated without executing the storage processing of the cylinder specific correction values Ksa of all the cylinders (step S508). Here, note that the cylinder specific correction value setting section 203A may continuously repeat the batch processing of collectively storing all the cylinder specific correction values Ksa [n] into the cylinder specific correction value batch storage section 206.

As described above, according to the second embodiment of the present invention, the final ignition timings θp can be set to the knocking limit ignition timings of the individual cylinders, respectively, so it is possible to obtain high output torque without generating output torque loss. In addition, simultaneously with this, all the cylinders are uniformly controlled to a retard angle side in response to the occurrence of a knock in either of the plurality of cylinders, so knocking does not occur in succession, and it is possible to ensure excellent knock controllability while suppressing the deterioration of user's audibility.

Moreover, the cylinder specific correction value batch storage section 206 is provided for storing the cylinder specific correction values Ksa [n] for all the cylinders in a batch or collective manner, so the variation of the knocking limit ignition timing resulting from the individual variation of the engine can be absorbed in addition to the above-mentioned operational effects being attained. As a result, high torque can always be obtained in each of the cylinders.

Further, by successively and repeatedly performing the batch storage processing of collectively storing the cylinder specific correction values Ksa [n] into the cylinder specific correction value batch storage section 206, it is possible to absorb not only the variation of the knocking limit ignition timing resulting from the individual variation of the engine but also the variation of the knocking limit ignition timing due to aging, as a consequence of which high torque can always be obtained in each of the cylinders.

Embodiment 3

Although in the above-mentioned second embodiment, no reference is made to the number or frequency of executions of batch storage processing of the cylinder specific correction values Ksa [n], the batch storage processing may be performed a predetermined number of times α2.

Hereinafter, reference will be made to the processing operation of the cylinder specific correction value setting section 203A with the number or frequency of storages being set to the predetermined number of times α2 according to a third embodiment of the present invention, while referring to a flow chart of FIG. 9 together with FIGS. 1 and 7. Here, note that the overall construction of an ignition timing control apparatus for an internal combustion engine according to the third embodiment of the present invention is as shown in FIG. 1. Also, the constructions of the cylinder specific ignition timing setting section 204 A, the cylinder specific correction value setting section 203A, the final ignition timing setting section 205 and the cylinder specific correction value batch storage section 206 are as shown in FIG. 7, and the calculation processing operation for the final ignition timing θp is as shown in FIG. 4 and FIG. 5.

In this case, the cylinder specific correction value setting section 203A executes the batch storage processing of collectively storing all the cylinder specific correction values Ksa [n] into the cylinder specific correction value batch storage section 206 repeatedly two times. The processing routine of FIG. 9 illustrates a storage operation for the cylinder specific correction values Ksa [n] executed by the CPU 111 (see FIG. 1) that constitutes the cylinder specific correction value setting section 203A in FIG. 7, wherein a processing routine of FIG. 8 is executed in response to an interrupt signal generated at each prescribed, specific crank angle.

Figure 9:
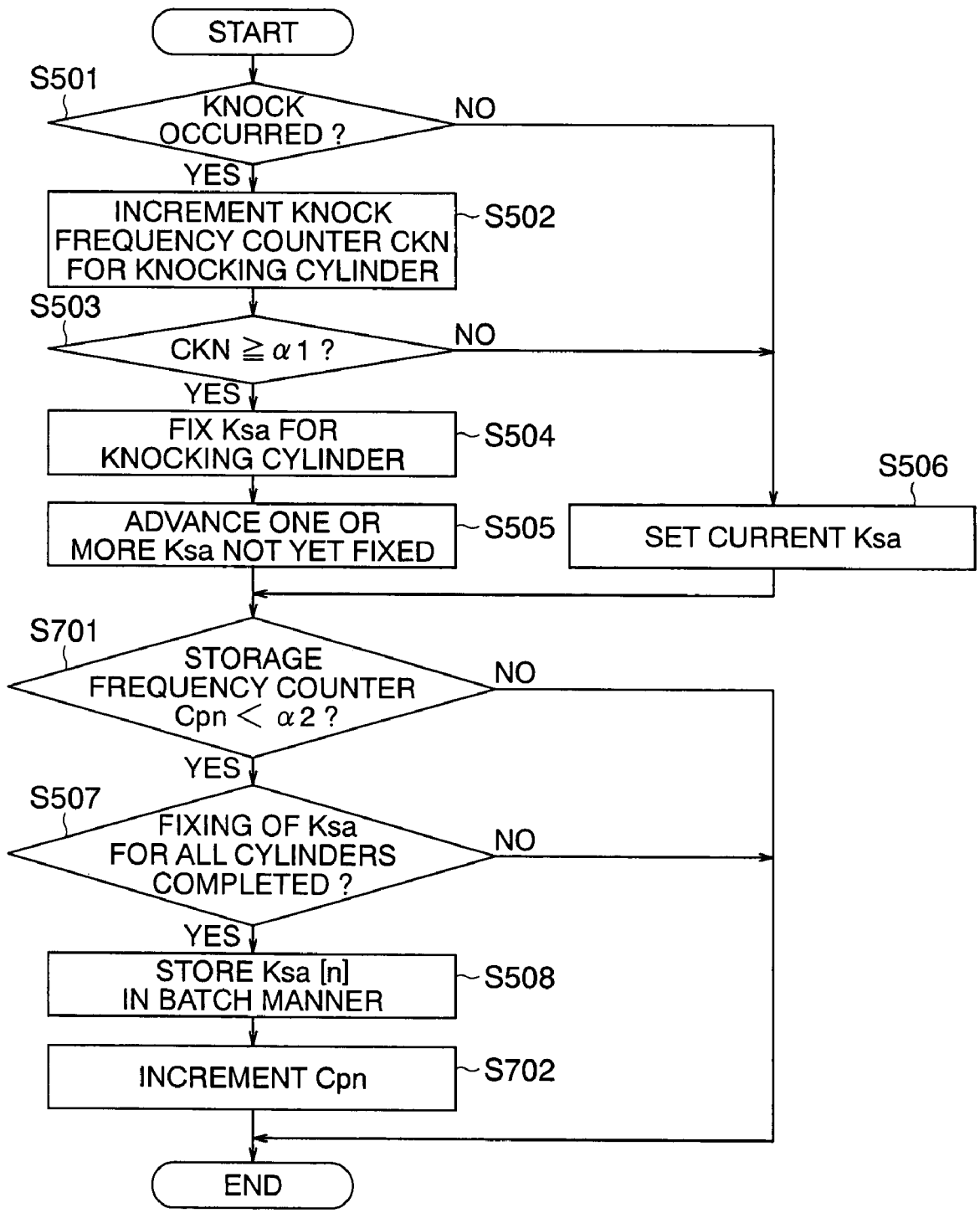
FIG. 9 is a flow chart illustrating the processing of calculating a cylinder specific correction value according to a third embodiment of the present invention.

In FIG. 9, steps S501 through S508 are update calculation processing of the cylinder specific correction values, similar to that as referred to above (see FIG. 8), and hence a detailed explanation thereof is omitted here. Following the above-mentioned advance angle processing and setting processing of the cylinder specific correction values Ksa (steps S505 and S506), the cylinder specific correction value setting section 203A determines whether the storage frequency of the cylinder specific correction values Ksa is less than the predetermined number of times α2 (e.g., 3 [times]) (step S701). That is, the value of a storage frequency counter Cpn, which counts up each time a cylinder specific correction value Ksa is stored is compared with the predetermined number of times α2 so as to make a determination as to whether Cpn is equal to α2.

When it is determined as Cpn≦α2 in step S701 (that is, NO), it is assumed that the number of executions of the batch storage processing of the cylinder specific correction value Ksa [n] reached the predetermined number of times α2 as required, and the processing routine of FIG. 9 is terminated at once.

On the other hand, when it is determined as Cpn<α2 in step S701 (that is, YES), the number of executions of the batch storage processing does not reach the predetermined number of times α2, so the above-mentioned determination processing (step S507) is executed. That is, based on whether the knock frequency counters CKN set for the individual cylinders, respectively, have each reached the predetermined number of times α1 (e.g., 2 [times]) in all the cylinders, it is determined whether the fixing of the cylinder specific correction values Ksa for all the cylinders is completed.

When it is determined in step S507 that the fixing of the cylinder specific correction values Ksa for all the cylinders is completed (that is, YES), the cylinder specific correction values Ksa [n] for all the cylinders are collectively stored in the cylinder specific correction value batch storage section 206 as one set or unit, as stated above (step S508). Subsequently, the batch storage processing of the cylinder specific correction values Ksa [n] has been completed one time, so the storage frequency counter Cpn is incremented (i.e., added by "1") (step S702), after which the processing routine of FIG. 9 is terminated.

On the other hand, in step S507, when the value of at least one of the knock frequency counters CKN set for the individual cylinders, respectively, indicates less than the predetermined number of times α1, it is determined that the fixing of a cylinder specific correction value Ksa in the cylinder concerned is not completed (that is, NO), and the processing routine of FIG. 9 is terminated without executing the batch storage processing of the cylinder specific correction values Ksa [n] of all the cylinders (step S508).

As described above, according to the third embodiment of the present invention, the final ignition timings θp for the individual cylinders can be set to the knocking limit ignition timings of the individual cylinders, respectively, so it is possible to obtain high output torque without generating output torque loss. In addition, all the cylinders are uniformly controlled to a retard angle side in response to the occurrence of a knock in either of the plurality of cylinders, so knocking does not occur in succession, and it is possible to ensure excellent knock controllability while suppressing the deterioration of user's audibility.

Moreover, by performing the batch storage processing of the cylinder specific correction values Ksa [n] for all the cylinders only two times, the variation of the knocking limit ignition timing resulting from the individual variation of the engine and the variation of the knocking limit ignition timing due to aging can be absorbed in addition to the above-mentioned operational effects being attained, high torque can always be obtained in each of the cylinders.

Further, in case where the batch storage processing of the cylinder specific correction values Ksa [n] for all the cylinders is executed only the predetermined number of times α2, as in the third embodiment of the present invention, there is no need to successively repeatedly store the knocking limit ignition timing for each cylinder in comparison with the case where such a batch storage processing is carried out in a successively repeated manner, so there is an advantageous effect that the frequency of knock occurrences is relatively stable, thus making it possible to improve marketability.

Embodiment 4

Although in the above-mentioned third embodiment (see FIG. 9), the batch storage processing of the cylinder specific correction values Ksa [n] is executed when the storage frequency counter Cpn is less than the predetermined number of times α2, the batch storage processing may be performed when another predetermined condition holds.

Hereinafter, reference will be made to the batch storage processing of the cylinder specific correction values Ksa [n] using another predetermined condition according to a fourth embodiment of the present invention, while referring to a flow chart of FIG. 10 together with FIGS. 1 and 7.

Figure 10:
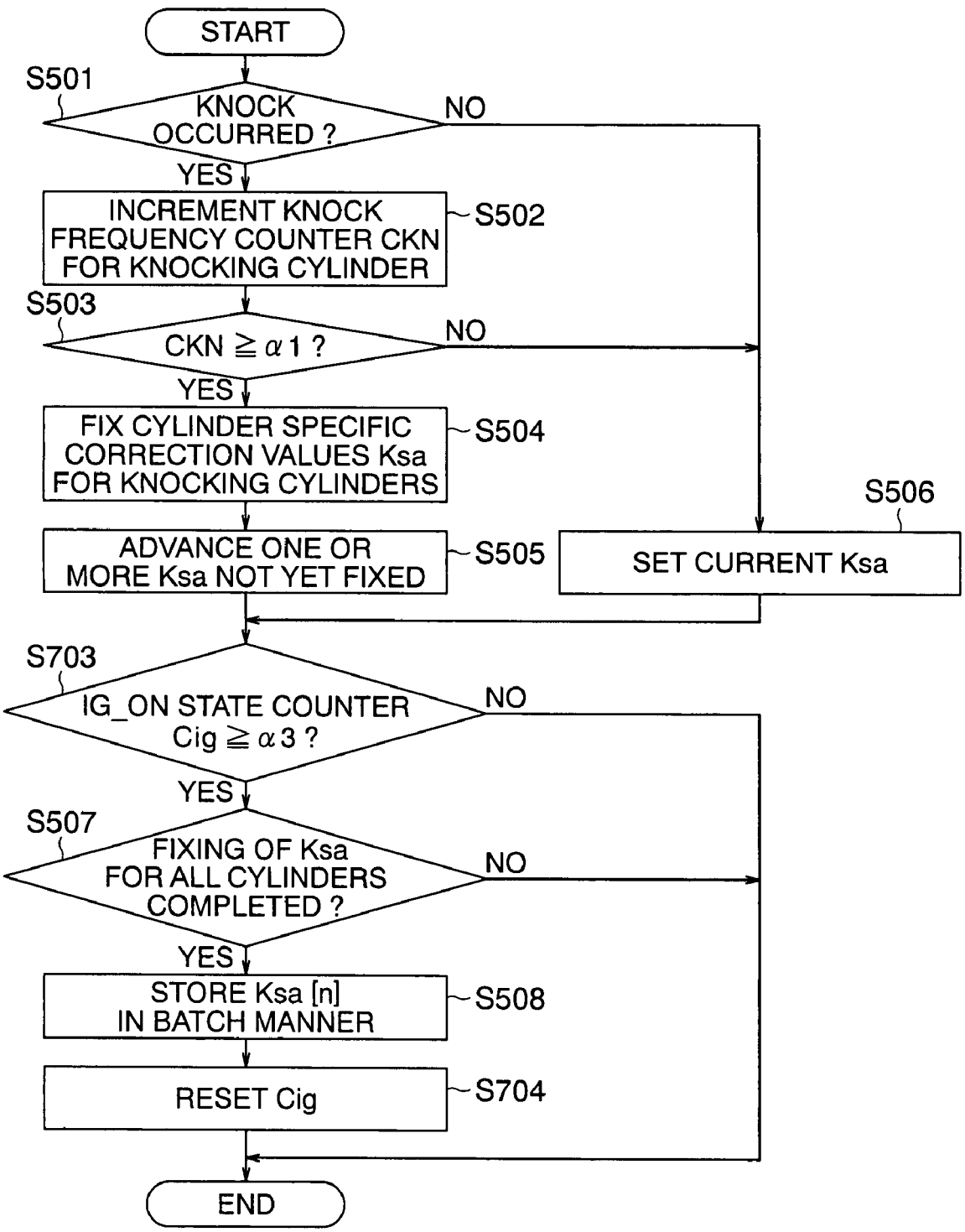
FIG. 10 is a flow chart illustrating the processing of storing a cylinder specific correction value according to a fourth embodiment of the present invention.

A processing routine of FIG. 10 illustrates storage processing for the cylinder specific correction values Ksa executed by the CPU 111 that constitutes the cylinder specific correction value setting section 203A, similarly as stated above (see FIG. 9), wherein the processing routine of FIG. 10 is executed in response to an interrupt signal generated at each prescribed, specific crank angle. In addition, the overall construction of an ignition timing control apparatus for an internal combustion engine and the functional configuration of the cylinder specific ignition timing setting section 204A according to the fourth embodiment of the present invention are similar to those as stated above (see FIG. 1 and FIG. 7), and hence a detailed explanation thereof is omitted here.

In this case, the cylinder specific correction value setting section 203A in FIG. 7 repeatedly executes, as another predetermined condition, the batch storage processing of collectively storing all the cylinder specific correction values Ksa [n] into the cylinder specific correction value batch storage section 206 each time the starting and stopping of the internal combustion engine 101 (see FIG. 1) is executed a predetermined number of times α3. That is, each time the starting and stopping of the internal combustion engine 101 is carried out the predetermined number of times α3, the cylinder specific correction value setting section 203A makes a determination that the predetermined condition is held, and executes the batch storage processing.

In FIG. 10, steps S501 through S508 are similar to the above-mentioned update calculation processing of the cylinder specific correction values Ksa, and hence a detailed explanation thereof is omitted here.

Following the above-mentioned advance angle processing and setting processing of the cylinder specific correction values Ksa (steps S505 and S506), the cylinder specific correction value setting section 203A determines whether the value of an IG_ON (ignition on) state counter Cig has reached the predetermined number of times α3 (e.g., 200 [times]) or more (step S703). The IG_ON state counter Cig counts the frequency of turned-on states of an ignition switch (not shown), and counts up each time the ignition switch is switched from an off state to an on state.

When it is determined as Cig<α3 in step S703 (that is, NO), it is assumed that the predetermined condition does not hold and the processing routine of FIG. 10 is terminated at once, whereas when it is determined as Cig≧α3 in step S703 (that is, YES), the control flow proceeds to step S507 where, similarly as stated above, it is determined whether the fixing of the cylinder specific correction values Ksa for all the cylinders is completed.

When it is determined in step S507 that the fixing of the cylinder specific correction values Ksa for all the cylinders is completed (that is, YES), the control flow proceeds to step S508 which is similar to the one as stated above, where the cylinder specific correction values Ksa [n] for all the cylinders are collectively stored in the cylinder specific correction value batch storage section 206 as one set or unit.

Subsequent to step S508, the IG_ON state counter Cig is reset (i.e., cleared to zero) (step S704), and the process of FIG. 10 is terminated.

On the other hand, when, in step S507, the value of at least one of the knock frequency counters CKN for the individual cylinders indicates less than the predetermined number of times α1, it is determined that the fixing of a cylinder specific correction value Ksa in the cylinder concerned is not completed (that is, NO), and the processing routine of FIG. 10 is terminated without executing the batch storage processing of the cylinder specific correction values Ksa [n] for all the cylinders.

Although in FIG. 10, an example of executing the storage processing to the cylinder specific correction value batch storage section 206 is executed in accordance with the frequency of switchings in which the ignition switch is switched from the off state to the on state, the present invention is not limited to this but other predetermined conditions may be used.

For example, when the IG_ON state (the on state of the ignition switch) continues more than a predetermined time, it may be simply determined that a predetermined condition holds. In this case, each time the predetermined time measured by a timer in the CPU 111 is reached, it is determined that the predetermined condition is held, so the storage processing to the cylinder specific correction value batch storage section 206 may be executed.

Further, there is a possibility that the cylinder specific correction values Ksa are changed by a change in the property of gasoline used as fuel, so it may be determined that a predetermined condition holds each time the replenishment of fuel or gasoline is made, or it may be determined that a predetermined condition holds each time the rate of change of the amount of consumed fuel or gasoline calculated from the fuel level in a fuel tank (not shown), the level gauge value of fuel or gasoline in the fuel tank, etc., reaches a predetermined amount of change, and the storage processing to the cylinder specific correction value batch storage section 206 may be executed.

As described above, according to this fourth embodiment of the present invention, each time the starting and stopping of the internal combustion engine 101 are carried out the predetermined number of times α3, or each time a predetermined time elapses, or each time a predetermined rate of change in the amount of consumed fuel of the internal combustion engine 101 occurs a predetermined number of times, the cylinder specific correction value setting section 203A determines that a predetermined condition has held, and executes the storage processing to the cylinder specific correction value batch storage section 206. As a result, the final ignition timings θp for the individual cylinders can be set to the knocking limit ignition timings of the individual cylinders, respectively, as stated above, so it is possible to obtain high output torque without generating output torque loss.

In addition, all the cylinders are uniformly controlled to a retard angle side in response to the occurrence of a knock in either of the plurality of cylinders, so knocking does not occur in succession, and it is possible to ensure excellent knock controllability while suppressing the deterioration of user's audibility.

Also, when a predetermined condition holds, the batch storage processing of the cylinder specific correction values Ksa [n] for all the cylinders is carried out the predetermined number of times α2, whereby even if the knocking limit ignition timing at the time when the predetermined condition holds and the knocking limit ignition timing at the time when the predetermined condition does not hold are different from each other, the variation of the knocking limit ignition timing can be absorbed with a high degree of precision, and hence high torque of each cylinder can always be obtained with a high degree of precision.

Moreover, when a predetermined condition holds, the batch storage processing of the cylinder specific correction values Ksa [n] for all the cylinders is carried out the predetermined number of times α2, whereby the variation of the knocking limit ignition timing resulting from the individual variation of the engine and or the variation of the knocking limit ignition timing due to aging can be absorbed. Besides, by determining whether the predetermined condition holds, it is possible to estimate the occurrence of aging, so high torque can always be obtained for each cylinder with relatively good efficiency.

Embodiment 5

In the third and fourth embodiments (FIG. 9 and FIG. 10), no consideration is given to the operating condition of the internal combustion engine 101 as a predetermined condition, but when a predetermined engine operating condition holds, a determination may be made that a predetermined condition holds, and the batch storage processing may be executed.

Hereinafter, reference will be made to the batch storage processing of the cylinder specific correction values Ksa [n] using a predetermined engine operating condition according to a fifth embodiment of the present invention, while referring to a flow chart of FIG. 11 together with FIGS. 1 and 7.

Figure 11:
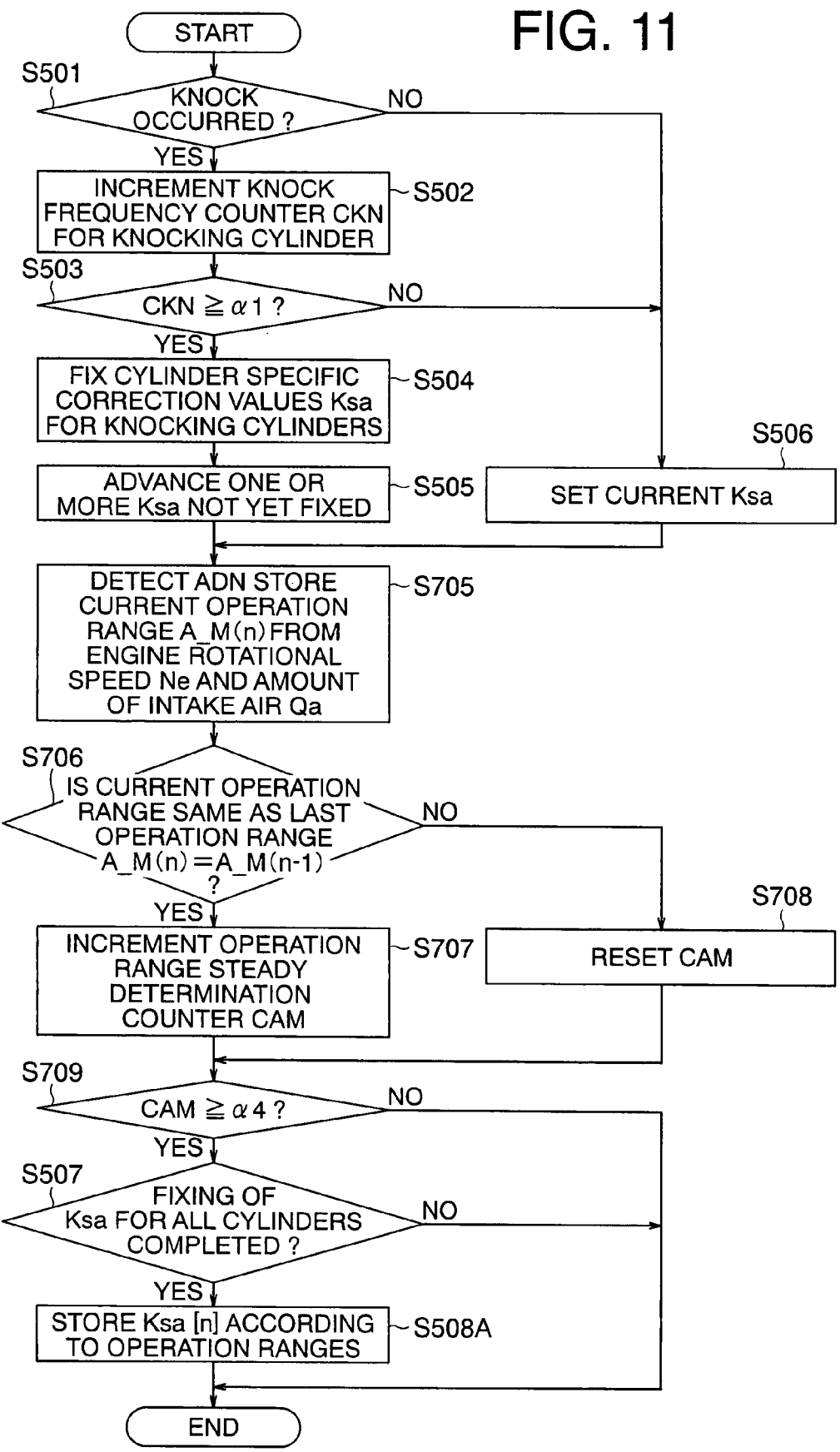
FIG. 11 is a flow chart illustrating the processing of storing a cylinder specific correction value according to a fifth embodiment of the present invention.

The processing routine of FIG. 11 is executed in response to an interrupt signal generated at each prescribed, specific crank angle, similarly as stated above. In addition, the overall construction of an ignition timing control apparatus for an internal combustion engine and the functional configuration of the cylinder specific ignition timing setting section 204A according to the fifth embodiment of the present invention are similar to those as stated above (see FIG. 1 and FIG. 7), and hence a detailed explanation thereof is omitted here.

In this case, when a predetermined operating condition of the internal combustion engine 101 holds, the cylinder specific correction value setting section 203A in FIG. 7 determines that a predetermined condition holds, and executes the batch storage processing of the cylinder specific correction values Ksa [n]. In addition, the cylinder specific correction value batch storage section 206 (see FIG. 7) according to the fifth embodiment of the present invention has a cylinder specific correction value storage map Mpn (not shown) which is defined by an engine rotational speed Ne as an axis of ordinate and by an amount of intake air Qa as an axis of abscissa. Here, it is assumed that the cylinder specific correction value storage map Mpn is divided into M operation ranges.

Figure 12:
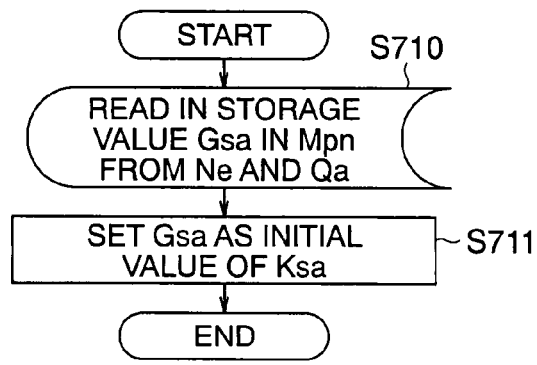
FIG. 12 is a flow chart illustrating the processing of calculating the cylinder specific correction value according to the fifth embodiment of the present invention.

The M operation ranges in the cylinder specific correction value storage map Mpn are designated by operation range Nos. A_M, and the cylinder specific correction values Ksa can be stored as the storage values of the regions designated by the operation range numbers A_M. As shown in a flow chart (see FIG. 12) to be described later, even when a storage value Gsa stored in each specific operation range is called and set as an initial value of a cylinder specific correction value Ksa from the cylinder specific correction value setting section 203A, the cylinder specific correction value storage map Mpn is used.

In FIG. 11, steps S501 through S507 are the same processes as stated above, and hence a detailed explanation thereof is omitted here. In addition, step 508A is a storage process corresponding to the above-mentioned step S508.

Following the above-mentioned advance angle process and setting process (steps S505 and S506) of the cylinder specific correction values Ksa, the cylinder specific correction value setting section 203A detects, from the conditions of the current engine rotational speed Ne and the amount of intake air Qa, in which operation range in the cylinder specific correction value storage map Mpn, the current operation range of the internal combustion engine 101 exists, and stores, as a current operation range, an operation range No. A_M(n) currently detected (step S705).

Subsequently, depending on whether the current operation range No. A_M(n) coincides with the last operation range No. A_M (n−1), it is determined whether the internal combustion engine 101 continuously exists in a specific operation range (step S706).

When it is determined as A_M(n)=A_M(n−1) in step S706 (that is, YES), it is assumed that the operating condition of the internal combustion engine 101 continuously exists in the same operation range, and an operation range steady determination counter CAM is incremented (counted up) by a predetermined value (step S707), and the control flow advances to the following determination processing (step S709).

On the other hand, when it is determined as A_M(n) ≠A_M(n−1) in step S706 (that is, NO), it is assumed that the operating condition of the internal combustion engine 101 does not continuously exist in the same region, so the operation range steady determination counter CAM is reset (cleared to zero) (step S708), and the control flow proceeds to step S709.

In step S709, it is determined whether the value of the operation range steady determination counter CAM reaches a predetermined number of times $\alpha 4$ (e.g., 4 [times]) or more. When it is determined as CAM<$\alpha 4$ in step S709 (that is, NO), it is assumed that the operating condition of the internal combustion engine 101 does not exist in a steady state, and the processing routine of FIG. 11 is terminated at once, whereas when it is determined as CAM≧$\alpha 4$ in step S709 (that is, YES), it is assumed that the operating condition of the internal combustion engine 101 is in the steady state and a predetermined condition holds. Accordingly, similarly as stated above, it is determined whether the fixing of the cylinder specific correction values Ksa for all the cylinders is completed (step S507).

When it is determined in step S507 that the fixing of the cylinder specific correction values Ksa for all the cylinders is completed (that is, YES), the cylinder specific correction values Ksa [n] for all the cylinders are collectively stored, as storage values in the operation range No. A_M(n) currently determined, in the cylinder specific correction value batch storage section 206 as one set or unit (step S508A), and the processing routine of FIG. 11 is terminated.

On the other hand, when it is determined in step S507 that the fixing of a cylinder specific correction value Ksa is not completed for either of the cylinders (that is, NO), the processing routine of FIG. 11 is terminated without executing the batch storage processing of the cylinder specific correction values Ksa [n] for all the cylinders.

In addition, the cylinder specific correction value storage map Mpn in the cylinder specific correction value batch storage section 206 is also used at the time of initializing the cylinder specific correction values Ksa in the cylinder specific correction value setting section 203A. Specifically, as shown in the flow chart of FIG. 12, the cylinder specific correction value setting section 203A calls the storage values Gsa stored the individual specific operation ranges, respectively, by referring to the cylinder specific correction value storage map Mpn in the cylinder specific correction value batch storage section 206 as shown in the flow chart of FIG. 12 (step S710), and sets the thus called storage values Gsa as the initial values of the cylinder specific correction values Ksa (step S711).

Although in step S508A in FIG. 11, the cylinder specific correction values Ksa [n] in the operation ranges, respectively, defined by the engine rotational speed Ne and the amount of intake air Qa are subjected to the batch storage processing, the operation ranges may be defined by using other parameters. For example, though the amount of intake air Qa indicates the state of the operating load or duty of the internal combustion engine 101, there may instead be used other parameters such as charging efficiency or volumetric efficiency of the internal combustion engine 101, throttle opening information from the throttle opening sensor 116, and an amount of operation of an accelerator pedal (not shown), etc.

Moreover, the operation ranges may be set by using, as a parameter indicating the operating condition of the internal combustion engine 101, the temperature of cooling water, the temperature of intake air, the temperature of lubricating oil, or the temperature of exhaust gas of the internal combustion engine 101, or the atmospheric pressure of an environment in which the internal combustion engine 101 is operating, etc.

Further, the batch storage processing to the cylinder specific correction value batch storage section 206 may be executed in accordance with whether a condition such as the air fuel ratio A/F of a mixture (the mixing ratio of air and fuel of the mixture that is combusted in the internal combustion engine 101), or the flow rate of exhaust gas (the flow rate of EGR) that flows through an exhaust gas recirculation system (not shown), or the crank angle (VVT phase angle) of the crankshaft at which the intake valve and the exhaust valve of the internal combustion engine 101 are opened and closed, in combination with the above-mentioned parameters holds.

As described above, according to the fifth embodiment of the present invention, when a predetermined operating condition (steady state operating condition) of the internal combustion engine 101 holds, the cylinder specific correction value setting section 203A determines that a predetermined condition holds, and performs, in each engine operation range, the batch storage processing of collectively storing the cylinder specific correction values Ksa [n] into the cylinder specific correction value storage map Mpn in the cylinder specific correction value batch storage section 206 in a repeated manner. Accordingly, the final ignition timings θp for the individual cylinders can be set to the knocking limit ignition timings of the individual cylinders, respectively, so it is possible to obtain high output torque without generating output torque loss.

In addition, all the cylinders are uniformly controlled to a retard angle side in response to the occurrence of a knock in either of the plurality of cylinders, so knocking does not occur in succession, and it is possible to ensure excellent knock controllability while suppressing the deterioration of user's audibility.

Further, though not shown in FIG. 11, similar to the above-mentioned third embodiment (see FIG. 9), when a predetermined condition holds, the batch storage processing of the cylinder specific correction values Ksa [n] for all the cylinders is carried out the predetermined number of times α2, whereby even if the knocking limit ignition timing at the time when the predetermined condition holds and the knocking limit ignition timing at the time when the predetermined condition does not hold are different from each other, the variation of the knocking limit ignition timing can be absorbed with a high degree of precision, and hence high torque can always be obtained in each of the cylinders with a high degree of precision.

Furthermore, similarly as stated above, when a predetermined operating condition (steady state operating condition) holds, the batch storage processing of the cylinder specific correction values Ksa [n] for all the cylinders is carried out the predetermined number of times α2, whereby it is possible to absorb not only the variation of the knocking limit ignition timing resulting from the individual variation of the engine and the aging thereof but also the variation of the knocking limit ignition timing due to the engine operating condition, as a consequence of which high torque can always be obtained in each of the cylinders with a high degree of precision.

Embodiment 6

Although in the above-mentioned second through fifth embodiments, no specific reference is made to an initial value setting section for setting the cylinder specific correction values Ksa, the cylinder specific correction value setting section 203A may be constructed to include such an initial value setting section so as to perform initial value setting processing for the cylinder specific correction values Ksa as required.

Hereinafter, reference will be made to a sixth embodiment of the present invention in which provision is made for an initial value setting section for setting the cylinder specific correction values Ksa, while referring to FIGS. 13 through 17 together with FIG. 1 and FIG. 7.

In this case, the above-mentioned cylinder specific correction value setting section 203A (see FIG. 7) includes the initial value setting section, and when the batch storage processing of collectively storing all the cylinder specific correction values Ksa [n] into the cylinder specific correction value batch storage section 206 is repeatedly executed, or when the batch storage processing is resumed upon holding of a predetermined condition after the predetermined condition no longer held to interrupt the batch storage processing, the initial value setting section sets, as the initial values, all the cylinder specific correction values corresponding to the plurality of cylinders stored in the cylinder specific correction value batch storage section. The overall construction of an ignition timing control apparatus for an internal combustion engine and the functional configuration of the cylinder specific ignition timing setting section 204A according to the sixth embodiment of the present invention are similar to those as stated above (see FIG. 1 and FIG. 7), and hence a detailed explanation thereof is omitted here.

Figure 13:
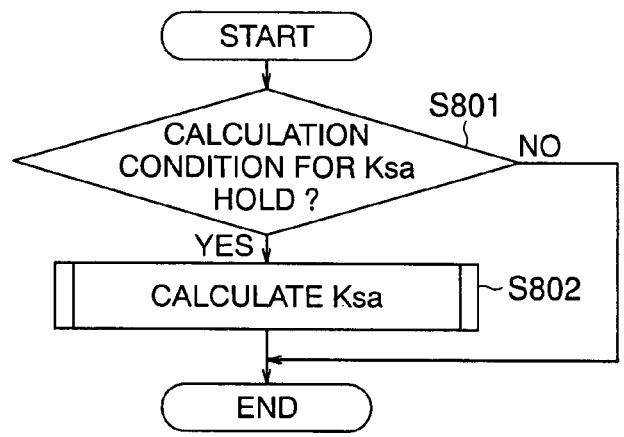
FIG. 13 is a flow chart illustrating the processing of calculating a cylinder specific correction value according to a sixth embodiment of the present invention.
Figure 15:
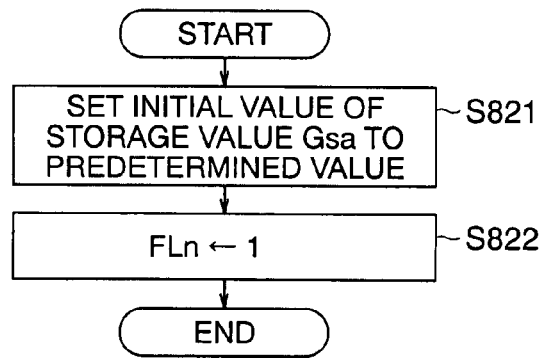
FIG. 15 is a flow chart illustrating the processing of initializing the stored value of the cylinder specific correction value according to the sixth embodiment of the present invention.
Figure 14:
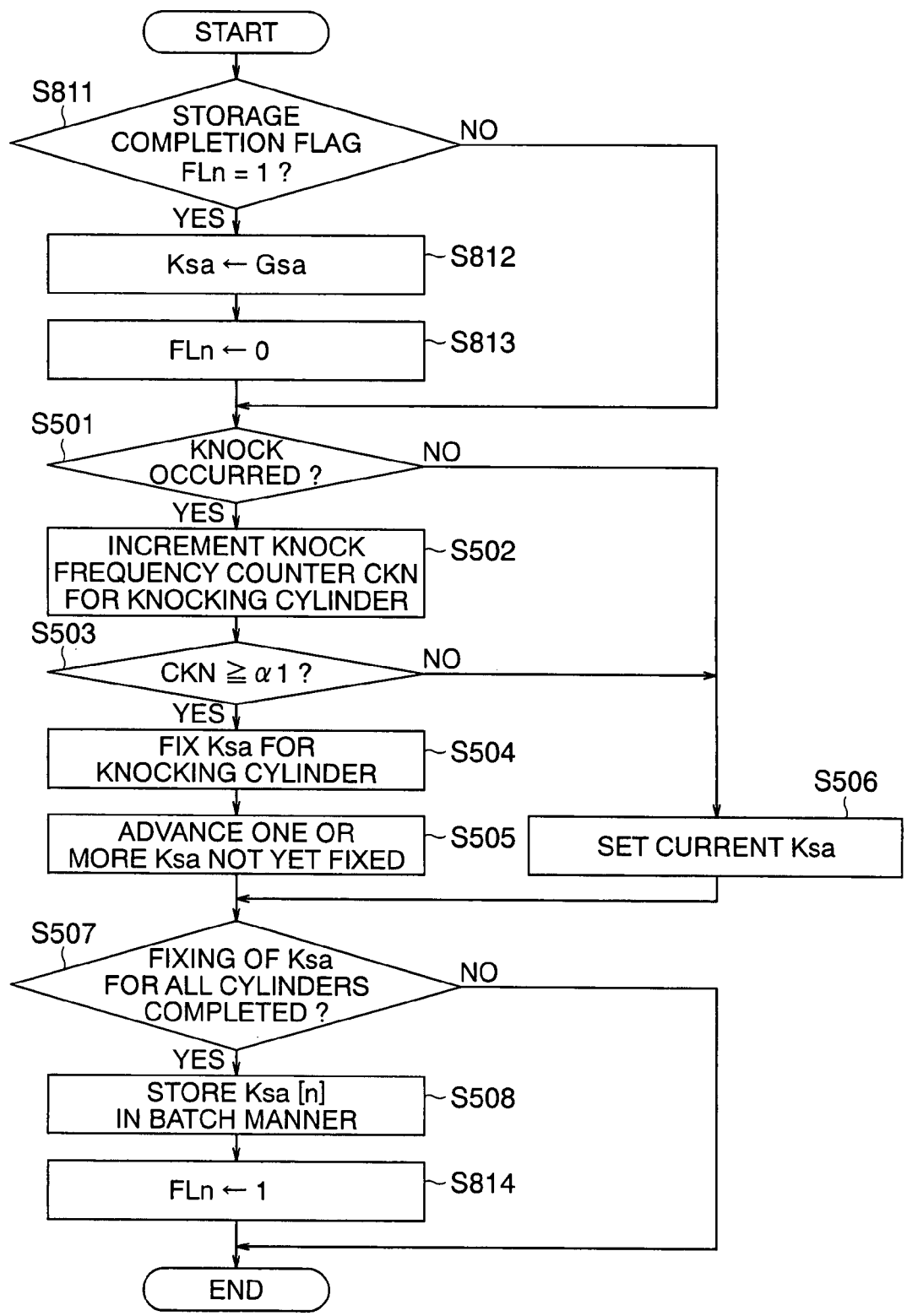
FIG. 14 is a flow chart illustrating the processing of calculating and storing a cylinder specific correction value according to the sixth embodiment of the present invention.
Figures 16, 17:
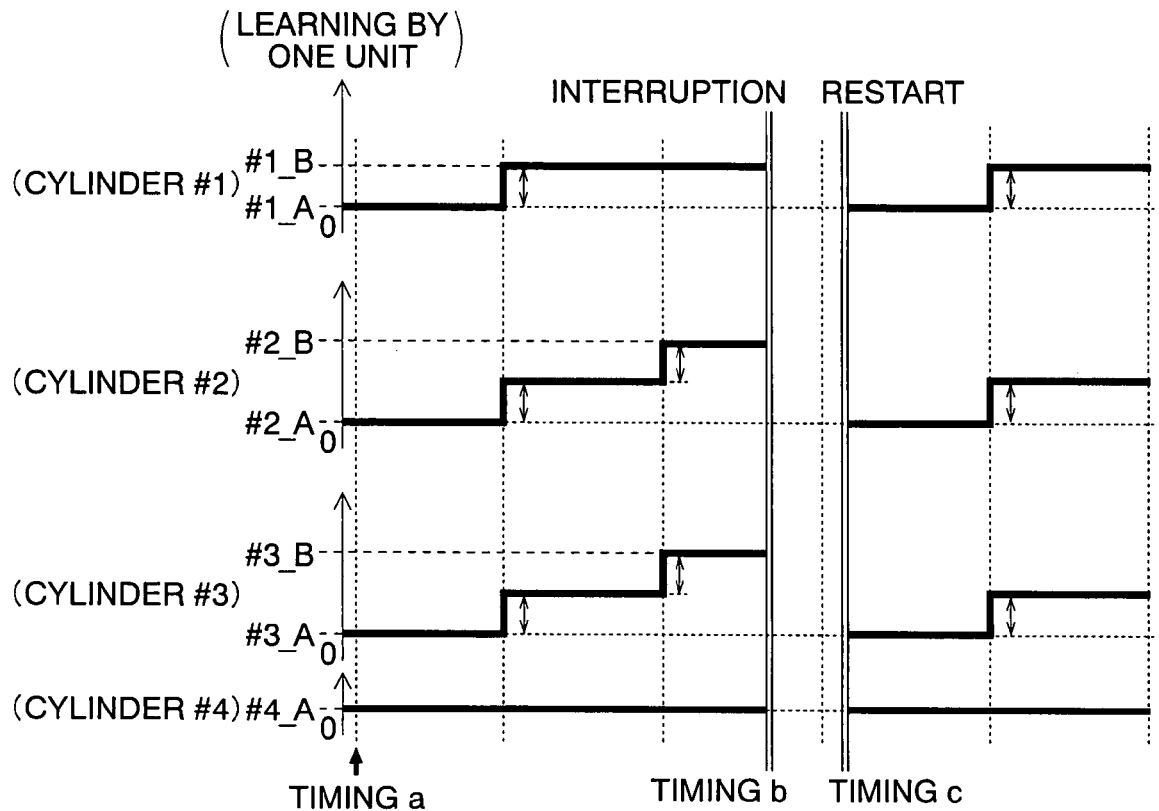
FIG. 16 is a timing chart showing the processing of storing the cylinder specific correction value according to the sixth embodiment of the present invention.
FIG. 17 is an explanatory view showing the stored value of the cylinder specific correction value according to the sixth embodiment of the present invention.

FIGS. 13 through 15 are flow charts that illustrate the calculation processing operation of the cylinder specific correction value setting section 203A according to the sixth embodiment of the present invention. FIG. 16 is a timing chart that illustrates the change over time of storage values Gsa according to the sixth embodiment of the present invention, and FIG. 17 is an explanatory view that shows, in a table, the storage values Gsa of the individual cylinders #1 through #4 at timing b (a point in time at which a calculation condition for the cylinder specific correction values Ksa failed) in FIG. 16.

A processing routine of FIGS. 13 and 14 is called and executed by an interrupt signal that is generated at each specific crank angle (specific pulse timing of the crank angle signal). Also, an initial value updating routine of FIG. 15 is called and executed in synchronization with the timing at which a battery (not shown) is turned on from a state in which the backup of the battery connected to the ECU 110 is turned off. Here, note that step S802 in FIG. 13 corresponds to the processing in steps S504 through S506 in FIG. 14.

In FIG. 13, the cylinder specific correction value setting section 203A first determines whether a calculation condition for the cylinder specific correction values Ksa holds (step S801), and when it is determined that the calculation condition for the cylinder specific correction values Ksa does not hold (that is, NO), the processing routine of FIG. 13 is terminated without executing the calculation processing of the cylinder specific correction values Ksa. On the other hand, when it is determined in step S801 that the calculation condition for the cylinder specific correction values Ksa holds (that is, YES), the current cylinder specific correction values Ksa are calculated (step S802), and the processing routine of FIG. 13 is terminated.

Here, note that in step S801, for example, when the engine rotational speed Ne is equal to or larger than a predetermined rotational speed (e.g., 500 [r/min]), and when the amount of intake air Qa is equal to or larger than a predetermined amount (e.g., 1 [L/S]), the cylinder specific correction value setting section 203A determines that the cylinder specific correction value calculation condition holds.

Next, reference will be made to the calculation processing and the initial value setting processing of the cylinder specific correction values Ksa while referring to FIG. 14. Here, note that steps S501 through S508 in FIG. 14 represent the processes similar to those as stated above (see FIG. 8 through FIG. 10).

In FIG. 14, depending on whether a storage completion flag FLn (this is set to "1" when a relevant cylinder specific correction value Ksa is stored) is set to "1", the cylinder specific correction value setting section 203A first determines whether the storage processing of the cylinder specific correction value Ksa has been executed (step S811).

When it is determined as FLn=0 in step S811 (that is, NO), it is assumed that the storage processing of the cylinder specific correction value Ksa is not executed, so the cylinder specific correction value Ksa is held, and the control flow advances to batch storage processing (steps S501 through S508) similar to the above-mentioned one. On the other hand, when it is determined as FLn=1 in step S811 (that is, YES), the current cylinder specific correction value Ksa is set to the same value as a storage value Gsa in the cylinder specific correction value batch storage section 206, as shown by the following expression (9) (step S812).

$$Ksa=Gsa \tag{9}$$

Subsequently, the storage completion flag FLn is reset to "0" (FLn=0) (step S813), and the control flow proceeds to step S501. In step S501, the knock detection value Vp is compared with the knock determination level Vth, and when "Vp≦Vth", it is determined that no knock has occurred, and the control process proceeds to step S506, whereas when the result of the comparison in step S501 is "Vp>Vth", it is determined that a knock has occurred in the currently ignited cylinder, so the knock frequency counter CKN of the knocking cylinder is incremented by "1" (step S502).

Subsequently, it is determined whether the knock frequency counter CKN for the knocking cylinder Nk is equal to or more than a predetermined number of times α1 (step S503), and when it is determined as CKN≧α1 (that is, YES), the cylinder specific correction value Ksa set for the knocking cylinder Nk is fixed to the last value (step S504). In addition, the cylinder specific correction values Ksa [Nm] for the cylinders (i.e., the cylinders Nm other than the knocking cylinder Nk) for which the knock frequency counters CKN are less than the predetermined number of times α1 are added by a predetermined value, whereby the ignition timings of the non-knocking cylinders are set to an advance angle side by the predetermined value from the cylinder specific correction value Ksa [Nk] for the knocking cylinder which has reached the predetermined number of times α1 with the occurrence of the current knock (step S505). Then, the calculation processing of the cylinder specific correction value Ksa is terminated, and the control flow proceeds to step S507.

On the other hand, when the knock frequency counter CKN for the knocking cylinder has not yet reached the predetermined number of times α1 in step S503, the current cylinder specific correction value Ksa is set as it is (step S506). Then, the calculation processing of the cylinder specific correction value Ksa is terminated, and the control flow proceeds to step S507.

In step S507, it is determined whether the fixing of the cylinder specific correction values Ksa is completed in all the cylinders (i.e., whether the knock frequency counters CKN for the individual cylinders are all equal to or more than the predetermined number of times α1), and when it is determined that the fixing processing of the cylinder specific correction values Ksa is completed, the cylinder specific correction values Ksa [n] (n=1, 2, . . . , N) for all the cylinders are stored as one set or unit in a collective manner (step S508).

Subsequently, the storage completion flag FLn is set to "1" (step S814), whereby it is clarified that the storage processing of the cylinder specific correction values Ksa [n] for all the cylinders is completed and the cylinder specific correction value Ksa can be reflected on the following cycle, and the processing routine of FIG. 14 is terminated.

On the other hand, in step S507, when either of the knock frequency counters CKN set for the individual cylinders, respectively, is less than the predetermined number of times α1, it is determined that the fixing of a cylinder specific correction value Ksa for the relevant cylinder is not completed, so the processing routine of FIG. 14 is terminated without performing the batch storage processing for the cylinder specific correction values Ksa [n] for all the cylinders.

Next, reference will be made to the processing of setting the initial values of the storage values Gsa into the cylinder specific correction value batch storage section 206 while referring to FIG. 15.

In FIG. 15, the cylinder specific correction value setting section 203A first sets a predetermined value (e.g., 0 [deg CA]) as a storage value Gsa in the cylinder specific correction value storage map Mpn with the battery being turned on (step S821). Subsequently, the correction completion flag FL is set to "1" (step S822), and the processing routine of FIG. 15 is terminated.

Next, reference will be made to the batch storage processing of the cylinder specific correction values Ksa while referring to FIG. 16 and FIG. 17. The timing chart of FIG. 16 illustrates the change over time of the cylinder specific correction values Ksa of the individual cylinders #1 through #4 calculated and set by the cylinder specific correction value setting section 203A, wherein an initial value setting operation is shown in case where processing is once interrupted at timing b, and is then resumed at the timing c. In FIG. 16, timing a (see an arrow) indicates storage timing in case where the cylinder specific correction values Ksa [n] for all the cylinders are collectively stored (learned) as one set or unit. Also, in FIG. 16 and FIG. 17, the storage values Ksa for the individual cylinders #1 through #4 are indicated by #1_A, #2_A, #3_A, #4_A, respectively.

In FIG. 16, first of all, at timing a, the cylinder specific correction value setting section 203A executes the batch processing of collectively storing the cylinder specific correction values Ksa [n], which correspond in number to the cylinders, into the cylinder specific correction value batch storage section 206. Thereafter, the fixing processing of the cylinder specific correction values Ksa is started from timing a, and is executed in the order of cylinder #4, cylinder #1, but the fixing processing for all the cylinders is not completed by the time when the calculation is once interrupted, so batch storage processing is not performed. Accordingly, the storage values Gsa stored at timing a are set as the initial values of the cylinder specific correction values Ksa set at the time when the calculation is resumed at timing c, as shown in FIG. 17.

As described above, according to this sixth embodiment of the present invention, the final ignition timings θp can be set to the knocking limit ignition timings of the individual cylinders, respectively, so it is possible to obtain high output torque without generating output torque loss.

In addition, all the cylinders are uniformly controlled to a retard angle side in response to the occurrence of a knock in either of the plurality of cylinders, so knocks do not occur in succession, and excellent knock controllability can be ensured while suppressing the deterioration of audibility.

Moreover, when the cylinder specific correction value setting section 203A continuously or successively performs calculation, or when the calculation condition for the cylinder specific correction values Ksa holds again to start calculation after once failed, the storage values Gsa obtained from the cylinder specific correction value batch storage section 206 are set as the initial values of the cylinder specific correction values Ksa, whereby the final ignition timings $\theta p$ of the individual cylinders can be set to their knocking limit ignition timings, respectively, with a high degree of precision. As a result, it is possible to obtain high output torque without generating output torque loss.

Embodiment 7

Figure 18:
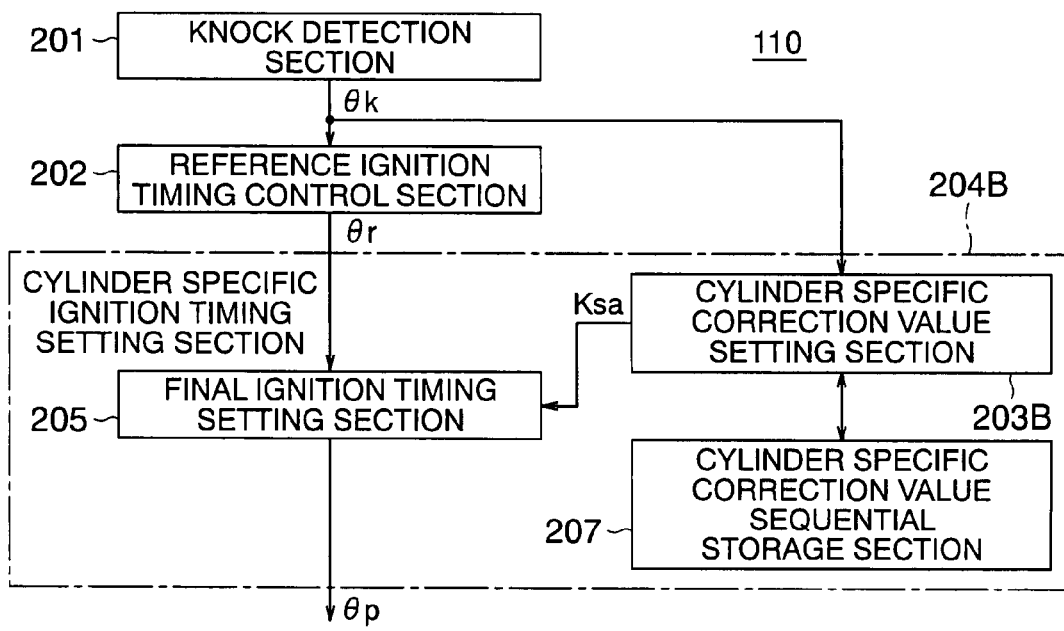
FIG. 18 is a functional block diagram showing the essential portions of an ignition timing control apparatus for an internal combustion engine according to a seventh embodiment of the present invention.

In the above-mentioned second through sixth embodiments, provision is made for the cylinder specific correction value batch storage section 206 (see FIG. 7) which cooperates with the cylinder specific correction value setting section 203A to collectively store the cylinder specific correction values Ksa [n] for all the cylinders upon completion of the fixing thereof, but a cylinder specific correction value sequential storage section 207 may be provided for sequentially storing the cylinder specific correction values Ksa [Nk] for knocking cylinders upon completion of the fixing thereof, as shown in FIG. 18.

Hereinafter, reference will be made to a seventh embodiment of the present invention while referring to FIGS. 18 and 19 together with FIG. 1.

FIG. 18 is a block diagram that shows the essential portions of an ignition timing control apparatus for an internal combustion engine according to the seventh embodiment of the present invention, in which the same or corresponding parts or elements as those as described above (see FIG. 7) are identified by the same symbols while omitting a detailed explanation thereof. In addition, a cylinder specific ignition timing setting section 204B corresponds to the above-mentioned cylinder specific ignition timing setting section 204A.

In FIG. 18, a cylinder specific correction value setting section 203B in the cylinder specific ignition timing setting section 204B has the cylinder specific correction value sequential storage section 207 that sequentially stores the cylinder specific correction values Ksa [Nk] corresponding to knocking cylinders Nk. Also, the cylinder specific correction value setting section 203B fixes, among the plurality of cylinder specific correction values Ksa [n], a cylinder specific correction value Ksa corresponding to a cylinder, which has reached the predetermined frequency of knock occurrences $\alpha 1$ until the occurrence of a current knock in a knock to knock occurrence period, and repeatedly performs the processing of setting at least one cylinder specific correction value Ksa corresponding to a cylinder, which has not yet reached the predetermined frequency of knock occurrences $\alpha 1$ until the occurrence of the current knock, to an advance angle side value (the above-mentioned steps S501 through S506).

Thereafter, when either of a plurality of cylinder specific correction values Ksa [n] are respectively fixed at least one time, the cylinder specific correction value setting section 203B sequentially stores the cylinder specific correction values Ksa [Nk] for the knocking cylinders, which have respectively been fixed at least one time, into the cylinder specific correction value sequential storage section 207 in a sequential manner.

Also, the cylinder specific correction value setting section 203B performs the processing of sequentially storing the cylinder specific correction values Ksa [Nk] for the knocking cylinders into the cylinder specific correction value sequential storage section 207 in a successive and repeated manner.

Hereinafter, reference will be made to the processing operations of the cylinder specific correction value setting section 203B and the cylinder specific correction value sequential storage section 207 according to the seventh embodiment of the present invention, as shown in FIG. 18, while referring to a flow chart of FIG. 19.

Figure 19:
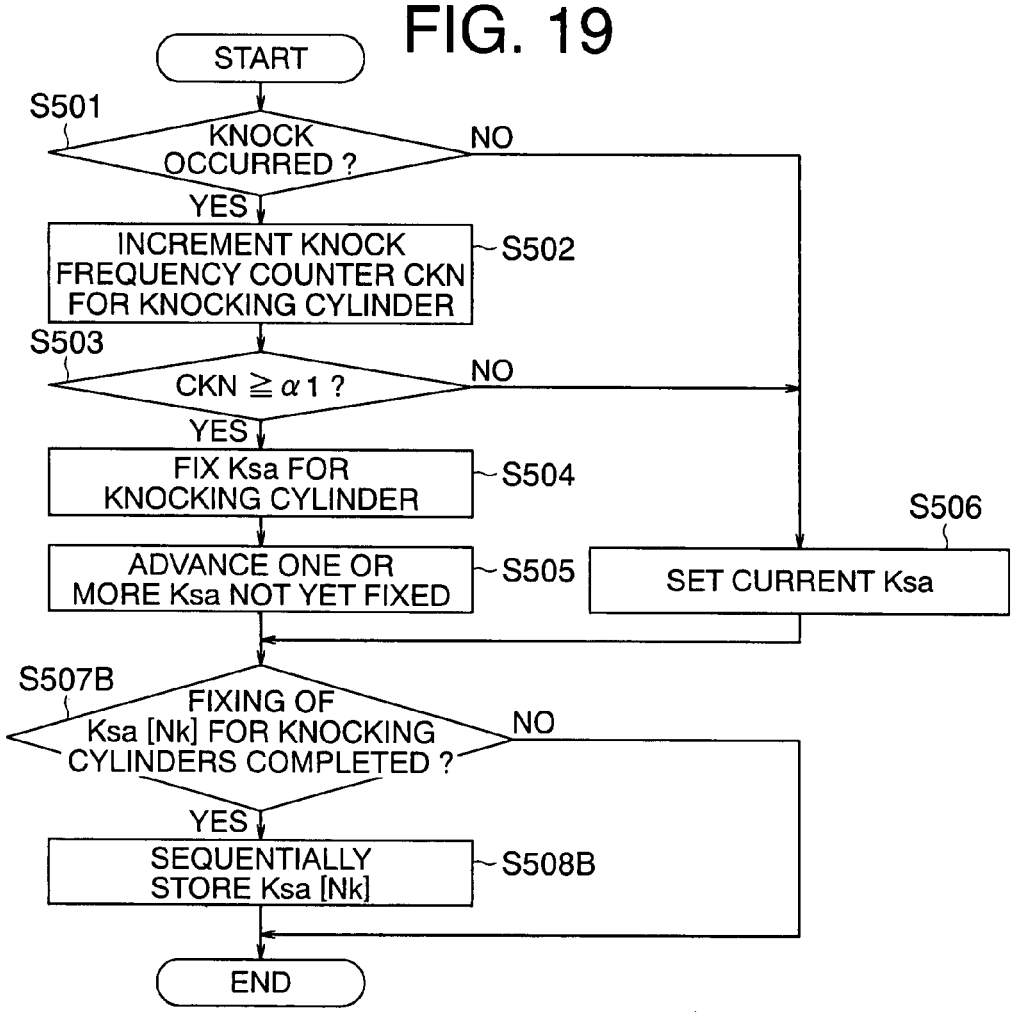
FIG. 19 is a flow chart illustrating the processing of calculating a cylinder specific correction value according to the seventh embodiment of the present invention.

Steps S501 through S506 in FIG. 19 represent the above-mentioned update calculation processing of the cylinder specific correction values Ksa [n], and steps S507B and S508B correspond to steps S507 and S508, respectively. In addition, the processing routine of FIG. 19 is executed by the CPU 111 (see FIG. 1) in the ECU 110, which constitutes the cylinder specific correction value sequential storage section 207, in accordance with an interrupt signal which is generated at each specific crank angle. The cylinder specific correction value sequential storage section 207 sequentially stores the cylinder specific correction values Ksa [n] (n=1, 2, . . . , N), which exist just only the number of the cylinders N that constitute the internal combustion engine.

In FIG. 19, subsequent to steps S501 through S506 similar to those as stated above, depending on whether a knock frequency counter CKN set for each knocking cylinder is equal to or more than the predetermined number of times $\alpha 1$ (e.g., 2 [times]), the cylinder specific correction value setting section 203B determines whether the fixing of the cylinder specific correction value Ksa [Nk] is completed in each knocking cylinder (step S507B).

In step S507B, when the value of the knock frequency counter CKN set for each knocking cylinder Nk is equal to or more than the predetermined frequency of knock occurrences $\alpha 1$ (CKN$\geq \alpha 1$) and hence it is determined that the fixing of the cylinder specific correction values Ksa [Nk] is completed in the knocking cylinders Nk (that is, YES), the cylinder specific correction values Ksa [Nk] of the knocking cylinders are sequentially stored (step S508B), and the processing routine of FIG. 19 is terminated.

On the other hand, when it is determined in step S507B that a knock frequency counter CKN for a knocking cylinder is less than the predetermined number of times $\alpha 1$ (CKN<$\alpha 1$) and hence the fixing of a relevant cylinder specific correction value Ksa [Nk] is not completed in the relevant knocking cylinder Nk (that is, NO), the processing routine of FIG. 19 is terminated without executing the processing of sequentially storing the cylinder specific correction values Ksa [Nk] for the knocking cylinders Nk into the cylinder specific correction value sequential storage section 207 (step S508B). In addition, sequential storage processing of the cylinder specific correction values Ksa [Nk] for the knocking cylinders Nk can be executed in succession by repeating the processing routine of FIG. 19.

As described above, according to the seventh embodiment of the present invention, the final ignition timings $\theta p$ for the individual cylinders can be set to the knocking limit ignition timings of the individual cylinders, respectively, so it is possible to obtain high output torque without generating output torque loss.

In addition, all the cylinders are uniformly controlled to a retard angle side in response to the occurrence of a knock in either of the plurality of cylinders, so knocking does not occur in succession, and it is possible to ensure excellent knock controllability while suppressing the deterioration of user's audibility.

Further, the cylinder specific correction values Ksa [Nk] for the individual cylinders are sequentially stored cylinder by cylinder without waiting for the completion of fixing of the cylinder specific correction values Ksa for all the cylinders, so the variation of the knocking limit ignition timing resulting from the individual variation of the engine can be absorbed in a quick manner, so high torque can always be obtained in each of the cylinders.

In addition, by successively performing, cylinder by cylinder, the processing of sequentially storing the cylinder specific correction values Ksa [Nk] for the knocking cylinders, it is possible to quickly absorb the variation of the knocking limit ignition timing resulting from the individual variation of the engine or the variation of the knocking limit ignition timing due to aging. Thus, there is also the following problem. As a consequence, high torque can always be obtained in each of the cylinders.

Embodiment 8

Although in the above-mentioned seventh embodiment, no reference is made to the frequency of executions of sequential storage processing of the cylinder specific correction values Ksa [n] for the knocking cylinders, the sequential storage processing may be performed a predetermined number of times $\alpha 2$.

Hereinafter, reference will be made to the processing operation of the cylinder specific correction value setting section 203B according to an eighth embodiment of the present invention, while referring to a flow chart of FIG. 20 together with FIGS. 1 and 18.

Here, note that the overall construction of an ignition timing control apparatus for an internal combustion engine according to the eighth embodiment of the present invention is as shown in FIG. 1, and the functional configuration of the cylinder specific ignition timing setting section 204B is as shown in FIG. 18. A processing routine of FIG. 20 is executed by the CPU 111, which constitutes the cylinder specific correction value setting section 203B, in accordance with an interrupt signal generated at each specific crank angle. In this case, the cylinder specific correction value setting section 203B executes the sequential storage processing of sequentially storing all the cylinder specific correction values Ksa [n] into the cylinder specific correction value sequential storage section 207 a predetermined number of times. In addition, the cylinder specific correction value setting section 203B has a storage frequency counter Cpk that is counted up each time the sequential storage processing of the cylinder specific correction values Ksa [Nk] into the cylinder specific correction value sequential storage section 207 is executed.

Figure 20:
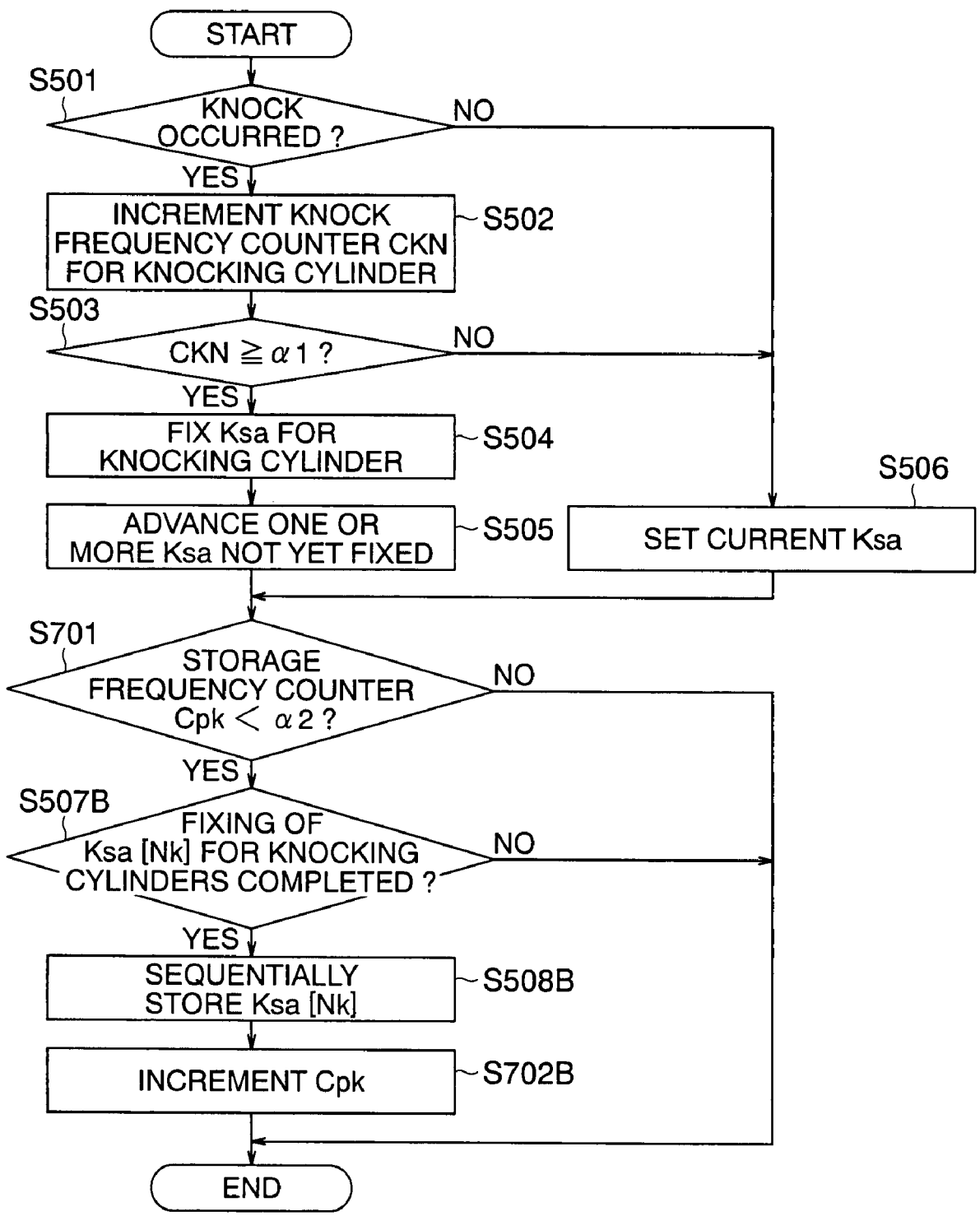
FIG. 20 is a flow chart illustrating the processing of storing a cylinder specific correction value according to an eighth embodiment of the present invention.

Steps S501 through S506 in FIG. 20 are the update calculation processing of the cylinder specific correction values Ksa, similar to that as referred to above, and hence a detailed explanation thereof is omitted here. In addition, steps S507B and S508B in FIG. 20 are similar to the processing in FIG. 19, and steps S701B and S702B correspond to the above-mentioned steps S701 and S702 (see FIG. 9), respectively.

In FIG. 20, subsequent to the steps S501 through S506 similar to those as stated above, the cylinder specific correction value setting section 203B determines, based on a comparison of the value of the storage frequency counter Cpk with a predetermined frequency or number of times $\alpha 2$ (e.g., 3 [times]), weather the storage frequency of the cylinder specific correction values Ksa [Nk] is less than the predetermined frequency $\alpha 2$ (step S701B).

When it is determined as Cpk<$\alpha 2$ in step S701B (that is, YES), it is subsequently determined, based on whether the value of the knock frequency counter CKN is equal to or more than a predetermined frequency or number of times $\alpha 1$, weather the fixing of the cylinder specific correction values Ksa [Nk] for the knocking cylinders Nk is completed (step S507B).

In step S507B, when the value of the knock frequency counter CKN for the knocking cylinders Nk is equal to or larger than the predetermined frequency $\alpha 1$ (CKN$\geq \alpha 1$) and hence it is determined that the fixing of the cylinder specific correction values Ksa [Nk] is completed (that is, YES), the sequential storage processing of the cylinder specific correction values Ksa [Nk] is carried out (step S508B). As a result, the sequential storage processing of the cylinder specific correction values Ksa [Nk] has been completed one time, so the storage frequency counter Cpk is incremented (i.e., counted up by "1") (step S702B), after which the processing routine of FIG. 20 is terminated, On the other hand, when it is determined in step S507B that the knock frequency counter CKN for the knocking cylinders is less than the predetermined frequency $\alpha 1$ (CKN<$\alpha 1$) and hence the fixing of the cylinder specific correction values Ksa [Nk] for the knocking cylinders Nk is not completed (that is, NO), the processing routine of FIG. 20 is terminated without executing the sequential storage processing (step S508B) of the cylinder specific correction values Ksa [Nk] for the knocking cylinders. On the other hand, when it is determined as Cpk$\geq \alpha 2$ in step S701B (that is, NO), it is assumed that the number or frequency of executions of the sequential storage processing of the cylinder specific correction values Ksa [Nk] has reached the predetermined frequency $\alpha 2$, and the processing routine of FIG. 9 is terminated.

As described above, according to the eighth embodiment of the present invention, by executing the sequential storage processing of the cylinder specific correction values Ksa [Nk] for the knocking cylinders Nk only the predetermined number of times $\alpha 2$, the variation of the knocking limit ignition timing resulting from the individual variation of the engine can be absorbed in a quick manner, so high torque can always be obtained in each of the cylinders, in addition to achieving the above-mentioned operational effects.

In addition, in case where the sequential storage processing of the cylinder specific correction values Ksa [Nk] for all the cylinders is executed only the predetermined number of times $\alpha 2$, there is no need to successively repeat the storage processing of storing the knocking limit ignition timings for the individual cylinders in comparison with the case where such sequential storage processing is carried out in succession, as in the above-mentioned seventh embodiment. Accordingly, there is an advantageous effect that the frequency of knock occurrences is relatively stable, thus making it possible to improve marketability.

Embodiment 9

Figure 21:
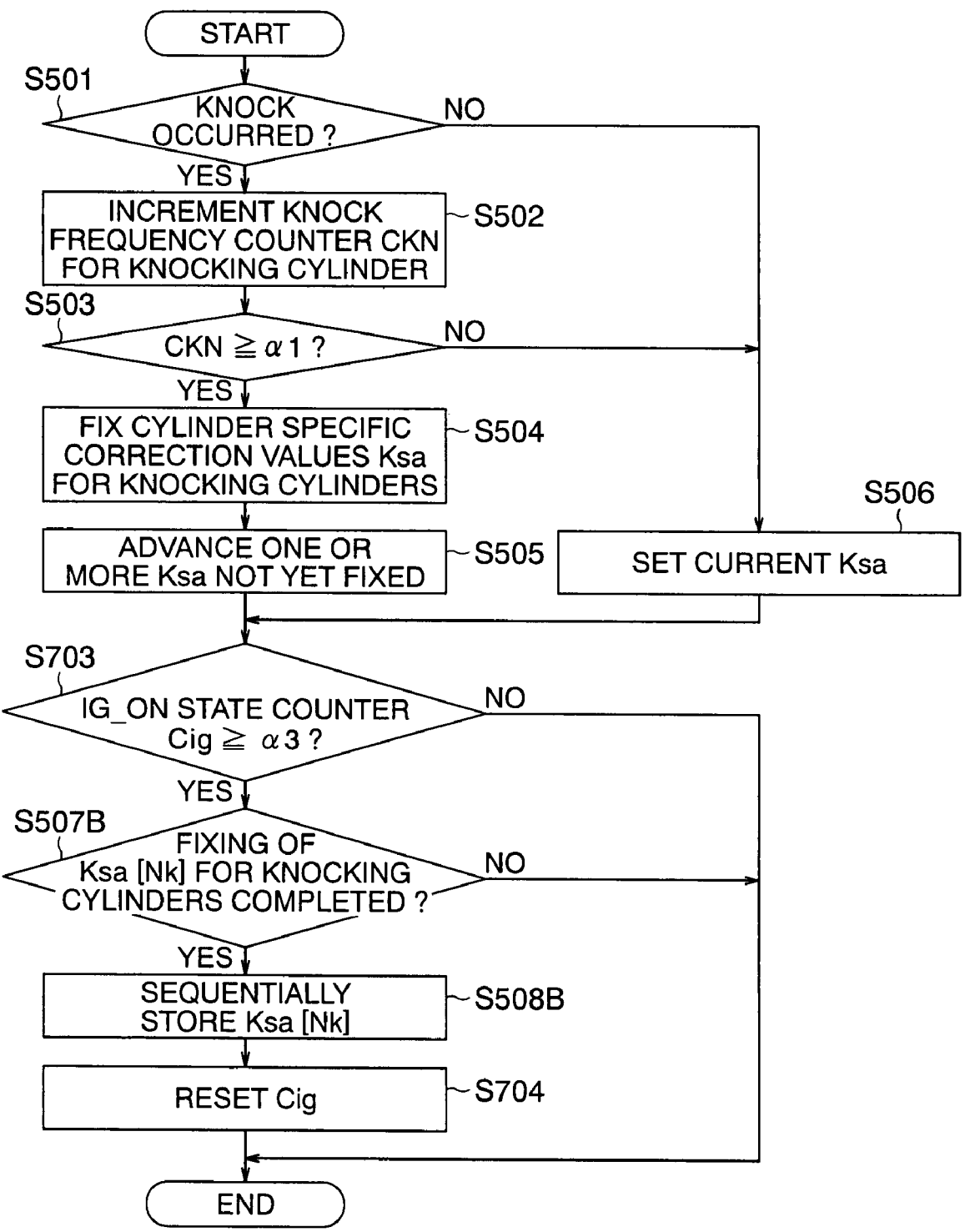
FIG. 21 is a flow chart illustrating the processing of storing a cylinder specific correction value according to a ninth embodiment of the present invention.

In the above-mentioned eighth embodiment (see FIG. 20), the sequential storage processing of the cylinder specific correction values Ksa [Nk] is executed when the storage frequency counter Cpk is less than the predetermined number of times α2, but the sequential storage processing may be carried out when other predetermined conditions hold, as shown in FIG. 21.

Hereinafter, reference will be made to the sequential storage processing of the cylinder specific correction values Ksa [Nk] by means of the cylinder specific correction value setting section 203B according to a ninth embodiment of the present invention, while referring to a flow chart of FIG. 21 together with FIGS. 1 and 8.

In this case, each time the starting and stopping of the internal combustion engine 101 is carried out a predetermined number of times, the cylinder specific correction value setting section 203B in FIG. 18 makes a determination that a predetermined condition holds, and executes the sequential storage processing of sequentially storing the cylinder specific correction values Ksa [Nk] for the knocking cylinders Nk into the cylinder specific correction value sequential storage section 207 in a repeated manner. A processing routine of FIG. 21 is executed by the CPU 111 in response to an interrupt signal generated at each prescribed, specific crank angle, similarly as stated above.

Steps S501 through S506 in FIG. 21 are the update calculation processing of the cylinder specific correction values Ksa, similar to that as referred to above, and hence a detailed explanation thereof is omitted here. In addition, steps S507B and S508B in FIG. 21 are similar to those in FIG. 19, and steps S703 and S704 are similar to the above-mentioned ones (see FIG. 10).

In FIG. 21, following the above-mentioned steps S501 through S506, the cylinder specific correction value setting section 203B determines whether the value of an IG_ON (ignition on) state counter Cig has reached a predetermined number of times α3 (e.g., 200 [times]) or more (step S703).

When it is determined as Cig≧α3 in step S703 (that is, YES), it is subsequently determined whether the fixing of the cylinder specific correction values Ksa [Nk] for the knocking cylinders is completed (step S507B). When it is determined in step S507B that the fixing of the cylinder specific correction values Ksa [Nk] is completed (that is, YES), the cylinder specific correction values Ksa [Nk] of the knocking cylinders are sequentially stored into the cylinder specific correction value subsequent storage section (step S508B), and the IG_ON state counter Cig is reset to "0" (step S704), after which the processing routine of FIG. 21 is terminated.

On the other hand, when it is determined as Cig<α3 in step S703 (that is, NO), the processing routine of FIG. 21 is terminated without executing the sequential storage processing (step S508B) of the cylinder specific correction values Ksa [Nk] for the knocking cylinders.

On the other hand, when it is determined in step S507 that the fixing of the cylinder specific correction values Ksa [Nk] for the knocking cylinders is not completed (that is, NO), the processing routine of FIG. 21 is terminated without executing the sequential storage processing (step S508B) of the cylinder specific correction values Ksa [Nk] for the knocking cylinders.

Here, note that in the above-mentioned ninth embodiment, the sequential storage processing of the cylinder specific correction values Ksa [Nk] is executed in accordance with the switching frequency of switching (OFF to ON) of the ignition switch, but the present invention is not limited to this and other predetermined conditions may instead be adopted. For example, when the IG_ON state (the on state of the ignition switch) continues more than a predetermined time, it may be simply determined that a predetermined condition holds, or the sequential storage processing of the cylinder specific correction values Ksa [Nk] may be executed at each predetermined time calculated by the timer in the CPU 111.

In addition, each time a predetermined amount of change in the amount of fuel used by the internal combustion engine 101 occurs a predetermined number of times, the cylinder specific correction value setting section 203B may determine that a predetermined condition holds. That is, there is a possibility that the cylinder specific correction values Ksa [Nk] are changed by a change in the property of gasoline used as fuel, so the sequential storage processing of the cylinder specific correction values Ksa [Nk] may be executed under a certain condition such as each time the replenishment of fuel or gasoline is made, or each time the amount of consumed fuel or gasoline calculated from the value of a level gauge of fuel or gasoline in the fuel tank, etc., reaches a predetermined amount of change.

As described above, according to the ninth embodiment of the present invention, the final ignition timings θp for the individual cylinders can be set to the knocking limit ignition timings of the individual cylinders, respectively, similarly as stated above, so high output torque can be obtained without generating output torque loss, and in addition, knocking does not occur in succession, thus making it possible to ensure excellent knock controllability while suppressing the deterioration of audibility.

In addition, when a predetermined condition holds, the sequential storage processing of the cylinder specific correction values Ksa [Nk] is carried out the predetermined number of times α2, whereby the variation of the knocking limit ignition timing can be absorbed in a highly precise and quick manner for a difference between the knocking limit ignition timing when the predetermined condition holds and the knocking limit ignition timing when the predetermined condition does not hold, as a consequence of which high torque can always be obtained in each of the cylinders with a high degree of precision.

Also, when a predetermined condition holds, the sequential storage processing of the cylinder specific correction values Ksa [Nk] is carried out the predetermined number of times α2, whereby the variation of the knocking limit ignition timing resulting from the individual variation of the engine or the variation of the knocking limit ignition timing due to aging can be absorbed. Besides, by determining whether the predetermined condition holds, it is possible to estimate the occurrence of aging, so high torque can always be obtained for each cylinder with relatively good efficiency.

Embodiment 10

Figure 22:
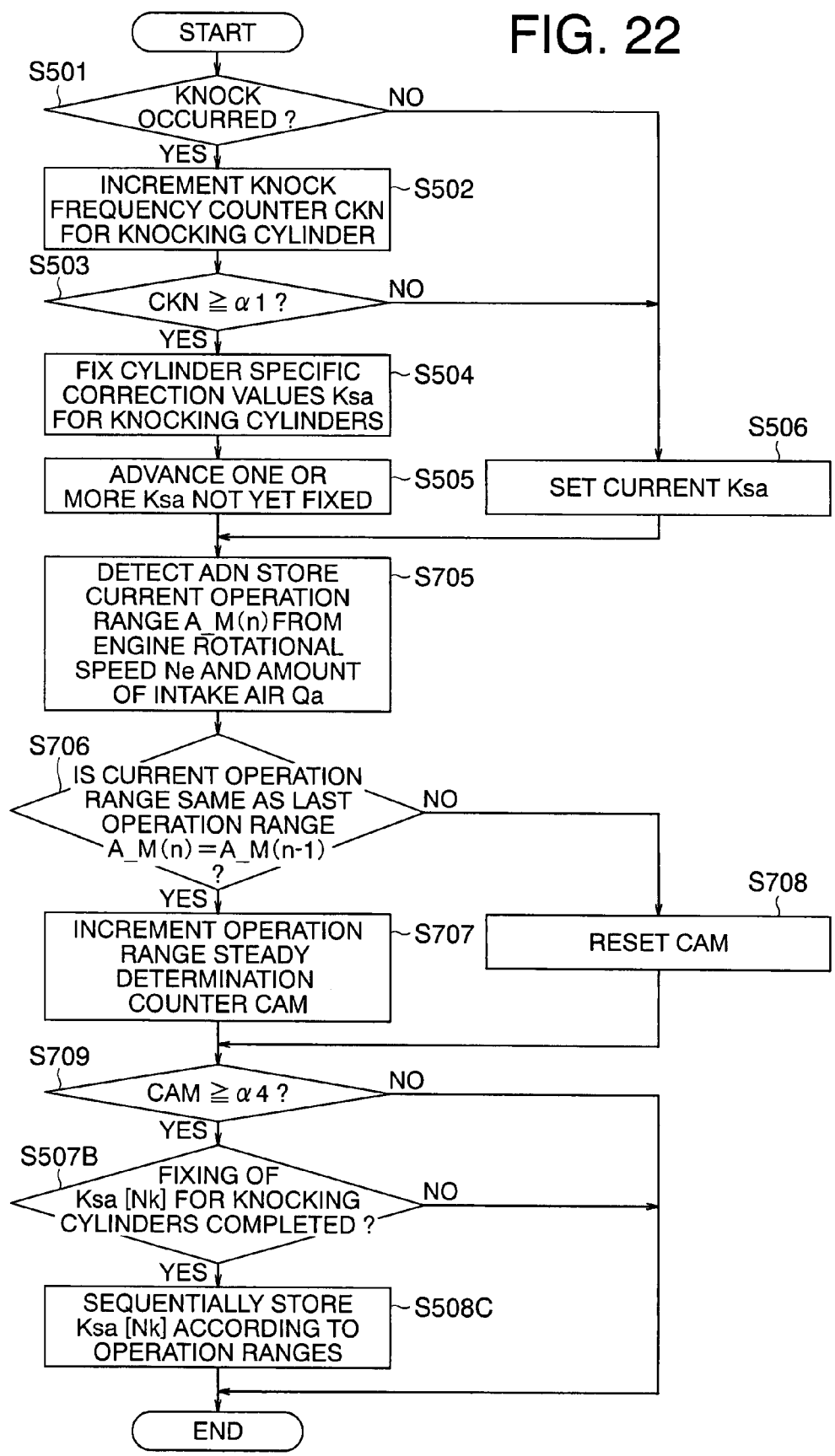
FIG. 22 is a flow chart illustrating the processing of storing a cylinder specific correction value according to a tenth embodiment of the present invention.

In the eighth and ninth embodiments (FIG. 20 and FIG. 21), no consideration is given to an operating condition of the internal combustion engine 101 as a predetermined condition, but when a predetermined engine operating condition holds as shown in FIG. 22, it is assumed that a predetermined condition holds, and the sequential storage processing may be executed.

Hereinafter, reference will be made to the sequential storage processing of the cylinder specific correction values Ksa [Nk] by means of the cylinder specific correction value setting section 203B according to a tenth embodiment of the present invention, while referring to a flow chart of FIG. 22 together with FIGS. 1 and 8.

A processing routine in FIG. 22 is executed in response to an interrupt signal generated at each prescribed, specific crank angle, similarly as stated above. In addition, the overall construction of an ignition timing control apparatus for an internal combustion engine and the functional configuration of the cylinder specific ignition timing setting section 204B according to the tenth embodiment of the present invention are similar to those as stated above (see FIG. 1 and FIG. 18), and hence a detailed explanation thereof is omitted here.

In this case, when a predetermined operating condition of the internal combustion engine 101 holds, the cylinder specific correction value setting section 203B in FIG. 18 determines that a predetermined condition holds, and executes the sequential storage processing of the cylinder specific correction values Ksa [Nk]. In addition, the cylinder specific correction value sequential storage section 207 according to the tenth embodiment of the present invention has a cylinder specific correction value storage map Mpn (not shown) which is defined by an engine rotational speed Ne as an axis of ordinate and by an amount of intake air Qa as an axis of abscissa, wherein it is assumed that the cylinder specific correction value storage map Mpn is divided into M operation ranges.

The individual operation ranges in the cylinder specific correction value storage map Mpn are designated by operation range Nos. A_M, and the cylinder specific correction values Ksa can be stored as the storage values Gsa of the regions designated by the operation range Nos. A_M. In addition, the cylinder specific correction value storage map Mpn is used in case where the storage values Gsa respectively stored in the individual specific operation ranges are called in step S710, as shown in the above-mentioned flow chart (see FIG. 12), and also in case where the storage values Gsa are set as the initial values of the cylinder specific correction values Ksa in the cylinder specific correction value setting section 203B in step S711.

In FIG. 22, steps S501 through S506 are the same processes as stated above, and hence a detailed explanation thereof is omitted here. In addition, step S507B is a process similar to the above-mentioned one (see FIG. 19 through FIG. 21), steps S705 through S709 are the same processes similar to the above-mentioned ones (see FIG. 11), and step S508C corresponds to step S508A in FIG. 11.

Following the above-mentioned steps S501 through S506, the cylinder specific correction value setting section 203B detects, from the conditions of the current engine rotational speed Ne and the amount of intake air Qa, in which operation range in the cylinder specific correction value storage map Mpn, the current operation state of the internal combustion engine 101 exists, and stores an operation range No. A_M of the current operation range thus detected (step S705).

Subsequently, depending on whether the current operation range No. A_M(n) coincides with the last operation range No. A_M (n−1), it is determined whether the internal combustion engine 101 continuously exists in a specific operation range (step S706). When it is determined as A_M(n)=A_M(n−1) (that is, YES), it is assumed that the internal combustion engine 101 continuously exists in the same operation range, an operation range steady determination counter CAM is incremented (counted up) by a predetermined value (step S707), and the control flow advances to the following determination processing (step S709).

On the other hand, when it is determined as A_M(n) *A_M(n−1) in step S706 (that is, NO), it is assumed that the operating condition of the internal combustion engine 101 does not continuously exist in the same region, and the operation range steady determination counter CAM is reset (cleared to 0) (step S708), after which the control flow advances to the following determination processing (step S709).

In step S709, it is determined whether the value of the operation range steady determination counter CAM is equal to or more than a predetermined number of times α4 (e.g., 4 [times]), and when it is determined as CAM≧α4 (that is, YES), it is assumed that the operating condition of the internal combustion engine 101 is in a steady state, after which the control flow advances to the following determination processing (step S507B).

In step S507B, depending on whether the knock frequency counters CKN set for the knocking cylinders, respectively, have each reached the predetermined number of times α1 (e.g., 2 [times]), it is determined whether the fixing of the cylinder specific correction values Ksa [Nk] for the knocking cylinders is completed. When it is determined in step S507B that the fixing of the cylinder specific correction values Ksa [Nk] is completed (that is, YES), the cylinder specific correction values Ksa [Nk] of the knocking cylinders are sequentially stored as the storage values Gsa in the range of operation numbers thus determined (step S508C), and the processing routine of FIG. 22 is terminated.

On the other hand, when it is determined in step S507B that the knock frequency counter CKN for the knocking cylinders is less than the predetermined number of times α1 (CKN<α1) and hence the fixing of the cylinder specific correction values Ksa [Nk] is not completed in the knocking cylinders Nk (that is, NO), the processing routine of FIG. 22 is terminated without executing the sequential storage processing of the cylinder specific correction values Ksa [Nk] (step S508C).

In addition, when it is determined as CAM<α4 in step S709 (that is, NO), it is assumed that the operating condition of the internal combustion engine 101 does not exist in a steady state, and the processing routine of FIG. 22 is terminated without executing the sequential storage processing of the cylinder specific correction values Ksa [Nk] (step S508C).

In step S508C in FIG. 22, the sequential storage processing of the cylinder specific correction values Ksa [Nk] is executed in the operation ranges, respectively, defined by the engine rotational speed Ne and the amount of intake air Qa, but the sequential storage processing of the cylinder specific correction values Ksa [Nk] may be carried out in each operation range based on other parameters. For example, though the amount of intake air Qa indicates the state of the operating load of the internal combustion engine 101, the charging efficiency or volumetric efficiency of the internal combustion engine 101 and the throttle opening or the amount of operation of the accelerator pedal, etc., may be used as parameters to define an operation range.

Moreover, the operation ranges may be set by using, as a parameter indicating the operating condition of the internal combustion engine 101, the temperature of cooling water, the temperature of intake air, the temperature of lubricating oil, or the temperature of exhaust gas of the internal combustion engine 101, or the atmospheric pressure of an environment in which the internal combustion engine 101 is operating, etc., similar to the aforementioned parameters indicating the operating condition of the internal combustion engine 101.

Further, it is needless to say that similar operational effects as stated above can be obtained even if the sequential storage processing of the cylinder specific correction values Ksa [Nk] is executed in accordance with a condition such as an air fuel ratio A/F, the flow rate of EGR in the form of the flow rate of exhaust gas flowing through an exhaust gas recirculation system, and a VVT phase angle indicating the crank angle for opening and closing the intake valve and the exhaust valve of the internal combustion engine 101, or various combinations of these parameters.

As described above, according to the tenth embodiment of the present invention, the final ignition timing θp can be set to the knocking limit ignition timing of each cylinder in each operation range, so it is possible to obtain high output torque without generating output torque loss.

In addition, all the cylinders are uniformly controlled to a retard angle side in response to the occurrence of a knock in either of the plurality of cylinders, so knocking does not occur in succession, and it is possible to ensure excellent knock controllability while suppressing the deterioration of user's audibility.

Moreover, when a predetermined condition holds, the sequential storage processing of the cylinder specific correction values Ksa [Nk] is carried out the predetermined number of times α2, whereby even if the knocking limit ignition timing at the time when the predetermined condition holds and the knocking limit ignition timing at the time when the predetermined condition does not hold are different from each other, the variation of the knocking limit ignition timing can be absorbed with a high degree of precision, and hence high torque can always be obtained in each of the cylinders with high precision.

Also, when a predetermined condition holds, the sequential storage processing of the cylinder specific correction values Ksa [Nk] is carried out the predetermined number of times α2, whereby it is possible to absorb not only the variation of the knocking limit ignition timing resulting from the individual variation of the engine or the variation depending on the engine operating condition but also the variation of the knocking limit ignition timing due to aging, as a consequence of which high torque can always be obtained in each of the cylinders.

Embodiment 11

Although in the above-mentioned seventh through tenth embodiments, no specific reference is made to an initial value setting section for setting the cylinder specific correction values Ksa, the cylinder specific correction value setting section 203B may be constructed to include such an initial value setting section so as to perform initial value setting processing for the cylinder specific correction values Ksa as required.

Hereinafter, reference will be made to an eleventh embodiment of the present invention in which provision is made for an initial value setting section for setting the cylinder specific correction values Ksa, while referring to FIGS. 23 through 25 together with FIGS. 1, 13, 15 and 18.

In this case, the above-mentioned cylinder specific correction value setting section 203B includes the initial value setting section, and when the sequential storage processing of sequentially storing the cylinder specific correction values Ksa [Nk] for the knocking cylinders Nk into the cylinder specific correction value sequential storage section 207 is repeatedly executed, or when the sequential storage processing is resumed upon holding of a predetermined condition after the predetermined condition no longer held to interrupt the sequential storage processing, the initial value setting section sets, as the initial values, the cylinder specific correction values Ksa [Nk] for the knocking cylinders Nk stored in the cylinder specific correction value sequential storage section 207.

Figure 23:
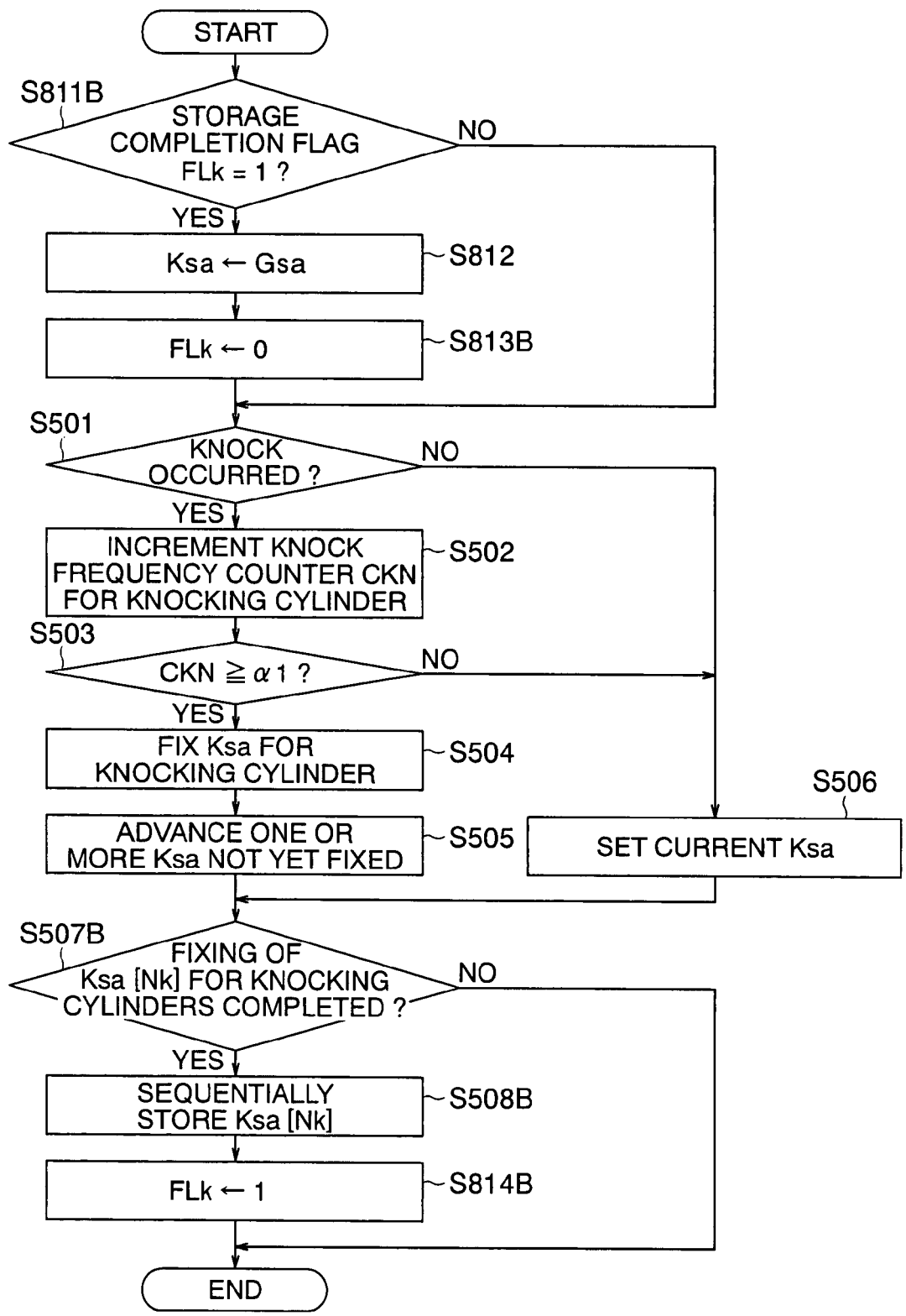
FIG. 23 is a flow chart illustrating the processing of calculating and storing a cylinder specific correction value according to an eleventh embodiment of the present invention.

FIG. 23 is a flow chart that illustrates the processing of calculating the cylinder specific correction values Ksa and the processing of setting the initial values thereof according to the eleventh embodiment of the present invention, and steps S501 through S506, S507B and S508B in FIG. 23 are the processes similar to the above-mentioned ones. Also, step S812 is similar to the process in the same step in FIG. 14 in the above-mentioned sixth embodiment, and steps S811B, S813B and S814B correspond to steps S811, S813 and S814 in FIG. 14, respectively.

In addition, the outlines of the calculation processing for the cylinder specific correction values Ksa and the initial value setting processing are as shown in FIG. 13 and FIG. 15, respectively. In this case, however, a storage completion flag FLn for batch storage processing in FIG. 15 is changed to a storage completion flag FLk for sequential storage processing.

First, in the above-mentioned FIG. 13, the cylinder specific correction value setting section 203B determines whether a calculation condition for the cylinder specific correction values Ksa holds (step S801), and when the calculation condition does not hold, the processing is terminated without calculating the cylinder specific correction values Ksa, whereas when the calculation condition holds, the cylinder specific correction values Ksa are calculated (step S802). The calculation condition at this time is set, for example, such that the engine rotational speed Ne is equal to or larger than 500 [r/min] and the amount of intake air Qa is equal to or more than 1 [L/S].

Now, a further specific explanation will be given to the calculation processing of the cylinder specific correction values Ksa while referring to FIG. 23.

In FIG. 23, depending on whether a storage completion flag FLk (this is set upon execution of the sequential storage processing for the cylinder specific correction values Ksa [Nk]) is "1", the cylinder specific correction value setting section 203B first determines whether the sequential storage processing of the cylinder specific correction values Ksa has been executed (step S811B).

When it is determined as FLk=0 in step S811B (that is, NO), it is assumed that the sequential storage processing of the cylinder specific correction values has not yet been executed, and the control flow proceeds to step S501 while leaving the cylinder specific correction values Ksa as they are. On the other hand, when it is determined as FLk=1 in step S811B (that is, YES), the storage values Gsa are set as the cylinder specific correction values Ksa, as in the above-mentioned expression (9) (step S812), and the storage completion flag FLk is reset (cleared to "0") (step S813B), after which the control flow proceeds to step S501.

In step S501, the presence or absence of the occurrence of a knock is determined by comparison between a knock detection value Vp and a knock determination level Vth, as previously stated. That is, when Vp>Vth, it is determined that a knock has occurred in the currently ignited cylinder, and the control flow proceeds to step S502, where the value of the knock frequency counter CKN of the knocking cylinder is counted up, and the control flow then advances to comparison determination processing with the predetermined value α1 (step S503).

When it is determined as CKN≧α1 in step S503, a cylinder specific correction value Ksa set for the knocking cylinder Nk is fixed (step S504), and the cylinder specific correction value Ksa of each of the cylinders for which the knock frequency counter CKN is less than α1 is set in such a manner that the ignition timings for the non-knocking cylinders become at a more advance angle side than the cylinder specific correction value of the knocking cylinder of which the frequency of knock occurrences has reached the predetermined number of times α1 with the occurrence of the current knock (step S505).

On the other hand, when the knock frequency counter CKN for the knocking cylinder has not yet reached the predetermined number of times α1 in step S503, the control flow proceeds to step S506 where the current cylinder specific correction value Ksa is set, and the calculation processing of the cylinder specific correction value Ksa is terminated. Also, when it is determined in step S501 that no knock has occurred, the control flow proceeds to step S506 where the current cylinder specific correction value Ksa is set as a cylinder specific correction value.

Subsequently, depending on whether the knock frequency counters CKN set for the knocking cylinders, respectively, have each reached the predetermined number of times α1 (e.g., 2 [times]), it is determined whether the fixing of the cylinder specific correction values Ksa [Nk] for the knocking cylinders is completed. When the fixing of the cylinder specific correction values Ksa [Nk] is completed, the control process proceeds to step S508B where the cylinder specific correction values Ksa [n] of the individual cylinders are sequentially stored cylinder by cylinder. Finally, the storage completion flag FLk is set to "1" so as to clearly indicate that the cylinder specific correction values Ksa [Nk] have been sequentially stored in a state capable of being reflected at the next cycle (step S814B), and the processing routine of FIG. 23 is terminated.

On the other hand, when at least one of the knock frequency counters CKN set for the individual knocking cylinders, respectively, is less than the predetermined number of times α1, it is determined that the fixing of a relevant cylinder specific correction value is not completed, and the processing routine of FIG. 23 is terminated without executing the sequential storage processing of the cylinder specific correction values Ksa [Nk].

Here, reference will be made to how to set the initial values of the storage values Gsa while referring to the above-mentioned flow chart of FIG. 15.

In FIG. 15, first in step S821, a predetermined value (e.g., 0 [deg CA]) is set as a storage value Gsa with the battery being turned on. Then, the control flow proceeds to step S822 where the storage completion flag FLk is set to "1", and the initial value setting processing is terminated, as in the case of the above-mentioned sixth embodiment.

Next, reference will be made to the storage processing and the initial value setting processing of the cylinder specific correction values Ksa while referring to a timing chart in FIG. 24 and an explanatory view in FIG. 25.

In FIG. 24, there is shown the change over time of the cylinder specific correction values Ksa when the calculation processing of the cylinder specific correction value setting section 203B is once interrupted at timing b and again resumed at timing c, similar to the above-mentioned one (see FIG. 16). Arrows in FIG. 24 indicate timings a1 through a4 at which the sequential storage processing is executed for each cylinder. Also, in FIG. 24, storage values Ksa for individual cylinders #1 through #4 are indicated by #1_A, #2_A, #3_A, respectively, or by #4_A, #1_B, #2_B, #3_B, #4_B, respectively.

In addition, in FIG. 25, there are shown in a tabulated form the storage values Gsa at timing b (at the time when the condition for calculation of the cylinder specific correction values Ksa does not hold), i.e., at the time when the calculation processing of the cylinder specific correction value setting section 203B is interrupted.

Hereinafter, reference will be made to the case where the cylinder specific correction values Ksa [Nk] are sequentially stored into the cylinder specific correction value sequential storage section 207. In this case, as shown in FIG. 24, between a period of time and from the initial timing a1 to the timing b at which the calculation processing is interrupted, there exist two timings, timing a2 and timing a3, for fixing and sequentially storing the cylinder specific correction values Ksa, respectively.

Accordingly, the storage values Gsa stored at timing b for the individual cylinders #1 through #4 are #1_B, #2_B, #3_B and #4_A, respectively, as shown in FIG. 25. As a result, the cylinder specific correction value sequential storage section 207, as shown in FIG. 25, are set as the initial values of the cylinder specific correction values Ksa at timing c at which the calculation processing is resumed in the respective cylinders.

Thus, in case where the cylinder specific correction value setting section 203B sequentially stores the cylinder specific correction values Ksa [Nk] into the cylinder specific correction value sequential storage section 207, the storage values Gsa in cylinder #1, cylinder #2 and cylinder #3 (see FIG. 25) are set to values close to the optimal ignition timing in comparison with the case where the cylinder specific correction values Ksa [n] for all the cylinders are stored into the cylinder specific correction value batch storage section 206 in a batch manner (see FIG. 17), as in the above-mentioned sixth embodiment, so the time required until the cylinder specific correction values Ksa [Nk] converge to the optimum ignition timings of the respective cylinders can be shortened.

As can be seen from foregoing, according to the eleventh embodiment of the present invention, the final ignition timings θp can be set to the knocking limit ignition timings of the individual cylinders, respectively, as stated above, so it is possible to obtain high output torque without generating output torque loss.

In addition, all the cylinders are uniformly controlled to a retard angle side in response to the occurrence of a knock in either of the plurality of cylinders, so knocking does not occur in succession, and it is possible to ensure excellent knock controllability while suppressing the deterioration of user's audibility.

Moreover, when the cylinder specific correction value setting section 203B continuously or successively performs calculation, or when the calculation condition for the cylinder specific correction values Ksa holds again to start calculation after once failed, the storage values Gsa obtained by the cylinder specific correction value sequential storage section 207 are set as the initial values of the cylinder specific correction values Ksa, whereby the final ignition timing θp can be set to the knocking limit ignition timing of each cylinder in a smooth and more accurate manner, so it is possible to obtain high output torque without generating output torque loss.

Embodiment 12

In the above-mentioned first through eleventh embodiments, when the result of the determination in step S501 in the cylinder specific correction value setting section indicates "non-occurrence of a knock", the control flow proceeds to step S506 where the current cylinder specific correction value Ksa is set as it is, but the cylinder specific correction value setting section may be provided with an advance angle processing section for advancing the cylinder specific correction values Ksa in accordance with the predetermined continuation condition for the state of the non-occurrence of a knock (non-knocking state).

Hereinafter, reference will be made to a twelfth embodiment of the present invention in which provision is made for an advance angle processing section for advancing the cylinder specific correction values Ksa, while referring to FIGS. 26 through 29 together with FIGS. 1, 2, 7 and 18.

Figure 27:
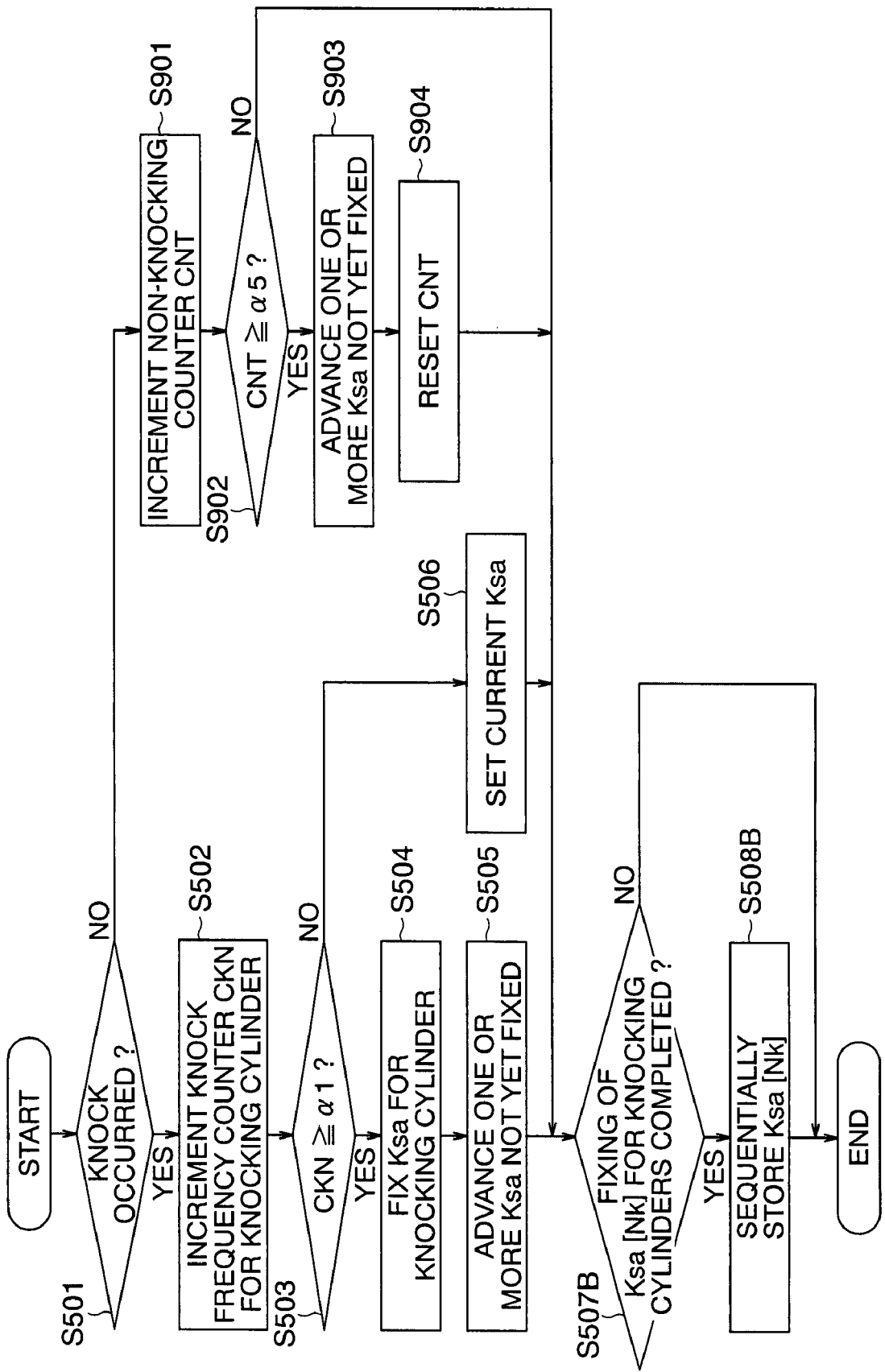
FIG. 27 is a flow chart illustrating the processing of calculating and storing a cylinder specific correction value according to the twelfth embodiment of the present invention.
Figure 28:
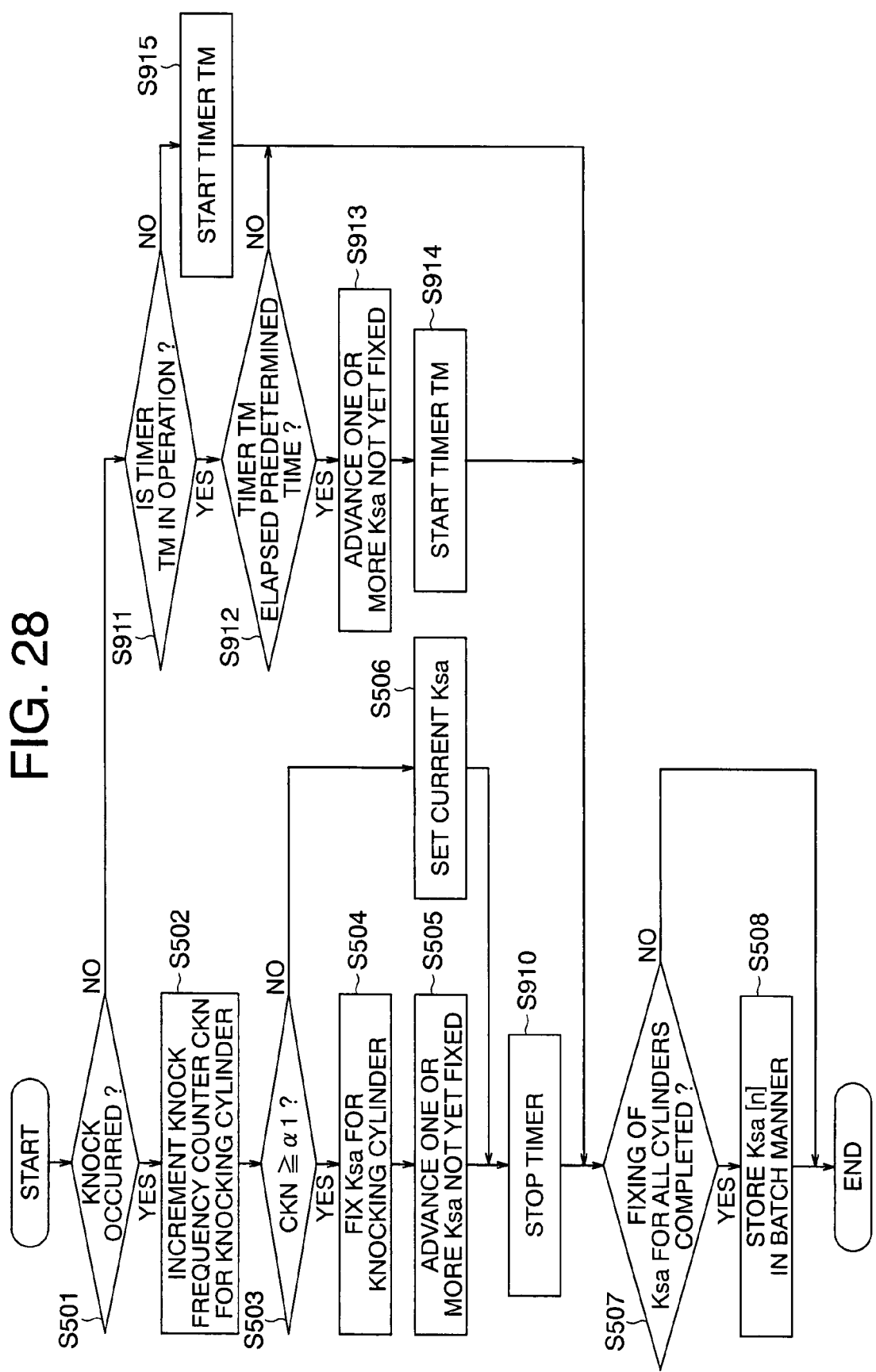
FIG. 28 is a flow chart illustrating the processing of calculating and storing a cylinder specific correction value according to the twelfth embodiment of the present invention.
Figure 29:
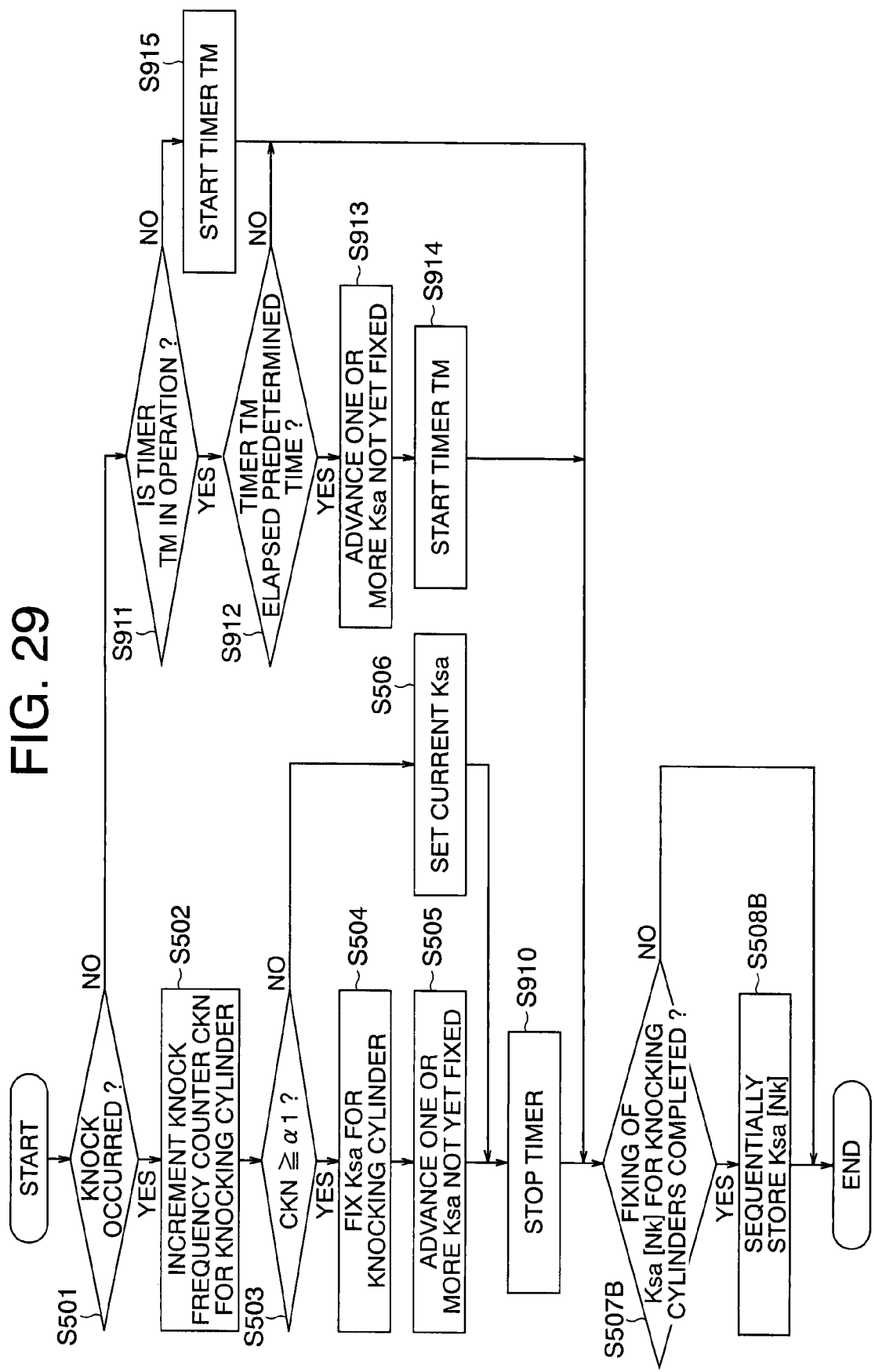
FIG. 29 is a flow chart illustrating the processing of calculating and storing a cylinder specific correction value according to the twelfth embodiment of the present invention.

FIG. 26 and FIG. 27 are flow charts in case where a non-knocking counter CNT is used for determination of a predetermined continuation condition by means of the advance angle processing section, and FIG. 28 and FIG. 29 are flow charts in case where a timer TM is use for determination of the predetermined continuation condition by means of the advance angle processing section. In addition, FIG. 26 and FIG. 28 show the case where the advance angle processing section is applied to the aforementioned second embodiment, and FIG. 27 and FIG. 29 show the case where the advance angle processing section is applied to the aforementioned seventh embodiment.

In this case, the cylinder specific correction value setting sections 203, 203A and 203B in FIG. 2, FIG. 7 and FIG. 18, respectively, have the advance angle processing section that functions in accordance with the predetermined continuance condition. The advance angle processing section sets, in a knock to knock occurrence period, at least one cylinder specific correction value Ksa, which corresponds, among a plurality of cylinder specific correction values Ksa [n], to a cylinder for which the frequency of knock occurrences has not yet reached a predetermined frequency of knock occurrences α1 until the occurrence of a current knock, to an advance angle side value in accordance with a predetermined continuation condition for the state of the non-occurrence of a knock (to be described later) when the predetermined continuation condition for the state of the non-occurrence of a knock is satisfied.

In FIG. 26, the steps S501 through S508 are processes which are similar to those shown in FIG. 8 in the aforementioned second embodiment, but are different therefrom only in the addition of the advance angle processing section (steps S901 through S904).

First of all, when it is determined, in a presence or absence determination process for the occurrence of a knock (step S501), that no knock has occurred upon each ignition control on the respective cylinders (that is, NO), the non-knocking counter CNT is incremented by a predetermined value (e.g., 1 [time]) (step S901), and it is further determined whether the value of the non-knocking frequency counter CNT is equal to or more than a predetermined number of times α5 (e.g., 100 [times]) (step S902).

When it is determined as CNT≧α in step S902 (that is, YES), one or more cylinder specific correction values Ksa not yet fixed are set so as to advance its or their ignition timing (step S903). At this time, the magnitude of the amount of advance angle set to an advance angle side is set to be greater than the width by which the cylinder specific correction values Ksa for cylinders other than knocking cylinders upon occurrence of knocking are set to an advance angle side with respect to the knocking cylinders. Then, the value of the non-knocking frequency counter CNT is reset (cleared to 0) (step S904), and the control flow advances to determination processing in step S507.

In addition, when it is determined as CNT<α5 in step S902 (that is, NO), the control flow proceeds to step S507 without executing advance angle side setting processing of the cylinder specific correction values Ksa (step S903).

Hereinafter, when it is determined in step S507 that the fixing of the cylinder specific correction values Ksa [n] is completed, the control flow proceeds to step S508, where the cylinder specific correction values Ksa [n] for all the cylinders are stored as one set in a batch manner, and the processing routine of FIG. 26 is terminated. On the other hand, when it is determined in step S507 that the fixing of either of the cylinder specific correction values is not completed, the processing routine of FIG. 26 is terminated without executing the batch storage processing of the cylinder specific correction values Ksa [n] (step S508).

In FIG. 26, reference has been made to the case where the cylinder specific ignition timing setting section 203A having the cylinder specific correction value batch storage section 206 (see FIG. 7) is provided with the advance angle processing section, but reference will next be made to the case where the cylinder specific correction value setting section 203B having the cylinder specific correction value sequential storage section 207 (see FIG. 18) is provided with the advance angle processing section, while referring to FIG. 27.

In FIG. 27, steps S501 through S506, S507B and S508B are processes which are similar to those shown in FIG. 19 in the aforementioned seventh embodiment, and steps S901 through S904 are processes similar to those in FIG. 26. That is, similarly as stated above, in steps S901 through S904 which constitute the advance angle processing section, when a predetermined continuation condition for the state of the non-occurrence of a knock (CNT≧α5) is satisfied, the cylinder specific correction values Ksa are set to advance angle side values.

Hereinafter, in step S507B following steps S501 through S506, it is determined whether the fixing of the cylinder specific correction values Ksa [Nk] for the knocking cylinders is completed, and when the fixing of the cylinder specific correction values Ksa [Nk] is completed, the control flow proceeds to step S508B where the cylinder specific correction values Ksa [Nk] are sequentially stored, and the processing routine of FIG. 27 is terminated.

In FIG. 26 and FIG. 27, reference has been made to the case where the counter CNT for counting the frequency of ignitions during non-occurrence of knocking is used so as to determine the predetermined continuation condition when the cylinder specific correction values Ksa of the cylinders for which the frequency of knock occurrences has not reached the predetermined number of times α1 are set to an advance angle side, but reference will next be made to the case where a timer TM is used for determination of the predetermined continuation condition, while referring to FIG. 28 and FIG. 29.

In FIG. 28 and FIG. 29, the time elapsed is measured by using the timer that is possessed by the CPU 111, instead of counting the frequency of ignitions in the state of non-occurrence of knocking, and when the time measured becomes equal to or more than a predetermined time, it is determined that the predetermined continuation condition is satisfied, so advance angle processing of the cylinder specific correction values Ksa is executed.

In FIG. 28, steps S501 through S508 are the same processes as those referred to above, and hence a detailed explanation thereof is omitted here. In this case, a difference between FIG. 28 and FIG. 26 is only that steps S910 through S915 are added in place of the above-mentioned steps S901 through S904 (see FIG. 26).

First of all, when a determination is made in step S501 that no knock has occurred, it is determined whether the timer TM is in operation (step S911).

When a determination is made in step S911 that the timer TM is in operation (that is, YES), it is subsequently determined whether the timer TM has elapsed a fixed time (e.g., 30 [sec]) (step S912).

When it is determined as TM≧ the fixed time in step S911 (that is, YES), it is assumed that the state of the non-occurrence of knocking has continuously existed over the predetermined time, so one or more cylinder specific correction values Ksa not yet fixed are set so as to advance its or their ignition timing (step S913), and the timer TM is reset (cleared to 0) (step S914), and the control flow advances to determination processing in step S507.

On the other hand, when it is determined in step S911 that the timer TM is out of operation (that is, NO), the timer is started (step S915) and the control flow proceeds to step S507. In addition, when it is determined as TM<the fixed time in step S912 (that is, NO), the state of non-occurrence of knocking has not continued the predetermined time or more, so the control flow proceeds to step S507 without executing advance angle processing (step S913).

On the other hand, when it is determined in step S501 that a knock has occurred (that is, YES), the timer TM is stopped after the processing in step S502 through S506 is executed (step S910), and the control flow proceeds to step S507. In step S507, it is determined whether the fixing of the cylinder specific correction values Ksa [n] is completed for all the cylinders, and when the fixing is completed, the control flow proceeds to step S508 where the cylinder specific correction values Ksa [n] for all the cylinders are stored in a batch manner, and the processing routine of FIG. 28 is terminated.

In FIG. 28, reference has been made to the case where the cylinder specific ignition timing setting section 203A for collectively storing the cylinder specific correction values for all the cylinders (see FIG. 7) is provided with the advance angle processing section, but reference will next be made to the case where the cylinder specific correction value setting section 203B for sequentially storing the cylinder specific correction values for knocking cylinders (see FIG. 18) is provided with the advance angle processing section, while referring to FIG. 29. In FIG. 29, the same or like processes as those described above (see FIGS. 19 and 28) are identified by the same symbols while omitting a detailed description thereof.

In step S507B in FIG. 29, it is determined whether the fixing of the cylinder specific correction values Ksa [Nk] is completed for the knocking cylinders, and when the fixing of the cylinder specific correction values Ksa [Nk] is completed, the control flow proceeds to step S508B where the cylinder specific correction values Ksa [Nk] are sequentially stored, and the processing routine of FIG. 29 is terminated.

By the provision of the advance angle processing sections (steps S901 through S904, S910 through S915) to the cylinder specific correction value setting section 203A and 203B, as shown in FIG. 26 through FIG. 29, the intervals between the occurrences of knocking are shortened, so it is possible to quickly fix the cylinder specific correction values Ksa, thereby making it possible to set optimal ignition timings for the individual cylinders.

As described above, according to the twelfth embodiment of the present invention, even in the state of the cylinder specific correction values Ksa having not yet been stored, by quickly storing the cylinder specific correction values Ksa, the final ignition timing can be set to the knocking limit ignition timing of each cylinder in a quick manner, so it is possible to obtain high output torque without generating output torque loss.

In addition, all the cylinders are uniformly controlled to a retard angle side in response to the occurrence of a knock in either of the plurality of cylinders, so knocking does not occur in succession, and it is possible to ensure excellent knock controllability while suppressing the deterioration of user's audibility.

While the invention has been described in terms of preferred embodiments, those skilled in the art will recognize that the invention can be practiced with modifications within the spirit and scope of the appended claims.

What is claimed is:

1. An ignition timing control apparatus for an internal combustion engine having a plurality of cylinders, said apparatus comprising:
    a knock detection section that detects the occurrence of a knock in either of said plurality of cylinders;
    a reference ignition timing control section that sets reference ignition timing common to all of said plurality of cylinders; and
    a cylinder specific ignition timing setting section that sets cylinder specific ignition timings different from one another for said plurality of individual cylinders, respectively;
    wherein said reference ignition timing control section includes a reference ignition timing correction section that corrects said reference ignition timing in accordance with a detection state of occurrence of knocking;
    said reference ignition timing correction section corrects said reference ignition timing to a retard angle side when the occurrence of a knock is detected, but corrects said reference ignition timing to an advance angle side when the occurrence of a knock is not detected;
    said cylinder specific ignition timing setting section includes a cylinder specific correction value setting section that sets cylinder specific correction values to compensate for variations in cylinder specific optimum ignition timings of said plurality of individual cylinders, respectively;
    said cylinder specific ignition timing setting section sets said cylinder specific ignition timings based on said reference ignition timing in accordance with said cylinder specific correction values;
    said cylinder specific correction value setting section sets said cylinder specific correction values of the same number as that of said plurality of cylinders; and
    in a knock to knock occurrence period from the time of detection of a current knock occurring in any of said plurality of cylinders until the occurrence of the following knock is detected in either of said plurality of cylinders after a period of time in which the occurrence of a knock has not been detected in either of said plurality of cylinders, said cylinder specific correction value setting section sets, among said plurality of cylinder specific correction values, at least one cylinder specific correction value, which corresponds to a cylinder that has not yet reached a predetermined frequency of knock occurrences until the occurrence of said current knock, to an advance angle side value.

2. The ignition timing control apparatus for an internal combustion engine as set forth in claim 1, wherein
    said cylinder specific correction value setting section includes a cylinder specific correction value batch storage section that stores all the cylinder specific correction values corresponding to said plurality of cylinders in a batch manner;
    said cylinder specific correction value setting section fixes, among said plurality of cylinder specific correction values, cylinder specific correction values corresponding to cylinders, which have reached said predetermined frequency of knock occurrences until the occurrence of said current knock in said knock to knock occurrence period, and repeatedly executes processing of setting at least one cylinder specific correction value, which corresponds to a cylinder that has not yet reached said predetermined frequency of knock occurrences until the occurrence of said current knock, to an advance angle side value; and when all the cylinder specific correction values corresponding to said plurality of cylinders are respectively fixed at least one time, said cylinder specific correction value setting section stores all said cylinder specific correction values in said cylinder specific correction value batch storage section in a batch manner.

3. The ignition timing control apparatus for an internal combustion engine as set forth in claim 2, wherein said cylinder specific correction value setting section executes batch storage processing of collectively storing all said cylinder specific correction values into said cylinder specific correction value batch storage section repeatedly a predetermined number of times.

4. The ignition timing control apparatus for an internal combustion engine as set forth in claim 2, wherein said cylinder specific correction value setting section continuously repeats the batch processing of collectively storing all said cylinder specific correction values into said cylinder specific correction value batch storage section.

5. The ignition timing control apparatus for an internal combustion engine as set forth in claim 2, wherein said cylinder specific correction value setting section repeatedly executes the batch processing of collectively storing all said cylinder specific correction values into said cylinder specific correction value batch storage section when a predetermined condition holds.

6. The ignition timing control apparatus for an internal combustion engine as set forth in claim 5, wherein each time the starting and stopping of said internal combustion engine has been executed a predetermined number of times, or each time a predetermined time has elapsed, or each time a predetermined amount of change in an amount of fuel used in said internal combustion engine has occurred a predetermined number of times, said cylinder specific correction value setting section makes a determination that said predetermined condition has held.

7. The ignition timing control apparatus for an internal combustion engine as set forth in claim 5, wherein when a predetermined operating condition of said internal combustion engine holds, said cylinder specific correction value setting section makes a determination that said predetermined condition holds.

8. The ignition timing control apparatus for an internal combustion engine as set forth in claim 2, wherein said cylinder specific correction value setting section includes an initial value setting section; and when the batch storage processing of collectively storing all said cylinder specific correction values into said cylinder specific correction value batch storage section is repeatedly executed, or when said batch storage processing is resumed upon holding again of said predetermined condition after said predetermined condition no longer held to interrupt said batch storage processing, said initial value setting section sets, as initial values, all the cylinder specific correction values corresponding to said plurality of cylinders stored in said cylinder specific correction value batch storage section.

9. The ignition timing control apparatus for an internal combustion engine as set forth in claim 1, wherein said cylinder specific correction value setting section includes a cylinder specific correction value sequential storage section that stores cylinder specific correction values corresponding to knocking cylinders among said plurality of cylinders in a sequential manner;

said cylinder specific correction value setting section fixes, among said plurality of cylinder specific correction values, cylinder specific correction values corresponding to cylinders, which have reached said predetermined frequency of knock occurrences until the occurrence of said current knock in said knock to knock occurrence period, and repeatedly executes processing of setting at least one cylinder specific correction value, which corresponds to a cylinder that has not yet reached said predetermined frequency of knock occurrences until the occurrence of said current knock, to an advance angle side value; and when either of said plurality of cylinder specific correction values is fixed at least one time, said cylinder specific correction value setting section sequentially stores cylinder specific correction values for said knocking cylinders, which have respectively been fixed at least one time, into said cylinder specific correction value sequential storage section.

10. The ignition timing control apparatus for an internal combustion engine as set forth in claim 9, wherein said cylinder specific correction value setting section executes sequential storage processing of sequentially storing said cylinder specific correction values for said knocking cylinders into said cylinder specific correction value sequential storage section repeatedly a predetermined number of times.

11. The ignition timing control apparatus for an internal combustion engine as set forth in claim 9, wherein said cylinder specific correction value setting section continuously repeats the sequential storage processing of sequentially storing said cylinder specific correction values for said knocking cylinders into said cylinder specific correction value sequential storage section.

12. The ignition timing control apparatus for an internal combustion engine as set forth in claim 9, wherein said cylinder specific correction value setting section continuously repeats the sequential storage processing of sequentially storing said cylinder specific correction values for said knocking cylinders into said cylinder specific correction value sequential storage section when a predetermined condition holds.

13. The ignition timing control apparatus for an internal combustion engine as set forth in claim 12, wherein each time the starting and stopping of said internal combustion engine has been executed a predetermined number of times, or each time a predetermined time has elapsed, or each time a predetermined amount of change in an amount of fuel used in said internal combustion engine has occurred a predetermined number of times, said cylinder specific correction value setting section makes a determination that said predetermined condition has held.

14. The ignition timing control apparatus for an internal combustion engine as set forth in claim 12, wherein
when a predetermined operating condition of said internal combustion engine holds, said cylinder specific correction value setting section makes a determination that said predetermined condition holds.

15. The ignition timing control apparatus for an internal combustion engine as set forth in claim 9, wherein
said cylinder specific correction value setting section includes an initial value setting section; and
when the sequential storage processing of sequentially storing cylinder specific correction values for said knocking cylinders into said cylinder specific correction value sequential storage section is repeatedly executed, or when said sequential storage processing is resumed upon holding again of said predetermined condition after said predetermined condition no longer held to interrupt said sequential storage processing, said initial value setting section sets, as initial values, the cylinder specific correction values for said knocking cylinders stored in said cylinder specific correction value sequential storage section.

16. The ignition timing control apparatus for an internal combustion engine as set forth in claim 1, wherein
said cylinder specific correction value setting section includes an advance angle processing section; and
said advance angle processing section sets, among said plurality of cylinder specific correction values, at least one cylinder specific correction value, which corresponds to a cylinder that has not yet reached said predetermined frequency of knock occurrences until the occurrence of said current knock in said knock to knock occurrence period, to an advance angle side value in accordance with a predetermined continuation condition.

* * * * *